(12) United States Patent
Green

(10) Patent No.: US 6,301,647 B1
(45) Date of Patent: Oct. 9, 2001

(54) REAL MODE TRANSLATION LOOK-ASIDE BUFFER AND METHOD OF OPERATION

(75) Inventor: Daniel W. Green, Plano, TX (US)

(73) Assignee: VIA-Cyrix, Inc., Plano, TX (US)

( * ) Notice: Subject to any disclaimer, the term of this patent is extended or adjusted under 35 U.S.C. 154(b) by 0 days.

(21) Appl. No.: 08/992,346

(22) Filed: Dec. 17, 1997

(51) Int. Cl.$^7$ .................................................. G06F 12/10
(52) U.S. Cl. ............................................ 711/207; 711/156
(58) Field of Search ................................... 711/207, 156, 711/122

(56) References Cited

U.S. PATENT DOCUMENTS

| | | | |
|---|---|---|---|
| 5,561,814 | * 10/1996 | Glew et al. | ........................... 711/170 |
| 5,564,111 | * 10/1996 | Glew et al. | ........................... 711/202 |
| 5,751,996 | * 5/1998 | Glew et al. | ........................... 711/145 |

* cited by examiner

*Primary Examiner*—Reginald G. Bragdon
(74) *Attorney, Agent, or Firm*—Carr & Ferrell LLP

(57) ABSTRACT

There is disclosed, for use in an x86-compatible processor capable of operating in real mode and paging mode and having a physically-addressable cache, an address translation device for providing physical addresses to the cache. The address translation device comprises: 1) a tag array for storing received untranslated addresses in selected ones of N tag entries in the tag array during real mode operations and paging mode operations; and 2) a data array for storing translated physical addresses corresponding to the untranslated addresses in selected ones of N data entries in the data array, wherein the untranslated addresses stored in the tag array during real mode operations are physical addresses equal to the corresponding translated physical addresses stored in the data array.

21 Claims, 17 Drawing Sheets

400

REAL MODE TRANSLATION LOOK-ASIDE BUFFER AND METHOD OF OPERATION

CROSS-REFERENCE TO RELATED APPLICATIONS

The present invention is related to those disclosed in:
1. U.S. Pat. No. 5,940,858, entitled "CACHE CIRCUIT WITH PROGRAMMABLE SIZING AND METHOD OF OPERATION" and issued on Aug. 17, 1999;
2. U.S. Pat. No. 6,065,091, entitled "TRANSLATION LOOK-ASIDE BUFFER SLICE CIRCUIT AND METHOD OF OPERATION" and issued on May 16, 2000;
3. U.S. Pat. No. 5,946,718, entitled "SHADOW TRANSLATION LOOK-ASIDE BUFFER AND METHOD OF OPERATION" and issued on Aug. 31, 1999;
4. U.S. Pat. No. 5,970,509, entitled "HIT DETERMINATION CIRCUIT FOR SELECTING A DATA SET BASED ON MISS DETERMINATIONS IN OTHER DATA SETS AND METHOD OF OPERATION" and issued on Oct. 19, 1999; and
5. U.S. Pat. No. 6,032,241, entitled "FAST RAM FOR USE IN AN ADDRESS TRANSLATION CIRCUIT AND METHOD OF OPERATION" and issued on Feb. 29, 2000.

Each reference is commonly assigned with the present invention and is incorporated herein by reference for all purposes.

TECHNICAL FIELD OF THE INVENTION

The present invention is directed, in general, to microprocessors and, more specifically, to a cache memory based microprocessor that employs a translation look-aside buffer (TLB) capable of operating in real addressing mode.

BACKGROUND OF THE INVENTION

The ever-growing requirement for high performance computers demands that state-of-the-art microprocessors execute instructions in the minimum amount of time. Over the years, efforts to increase microprocessor speeds have followed different approaches. One approach is to increase the speed of the clock that drives the processor. As the clock rate increases, however, the processor's power consumption and temperature also increase. Increased power consumption increases electrical costs and depletes batteries in portable computers more rapidly, while high circuit temperatures may damage the processor. Furthermore, processor clock speed may not increase beyond a threshold physical speed at which signals may traverse the processor. Simply stated, there is a practical maximum to the clock speed that is acceptable to conventional processors.

An alternate approach to improving processor speeds is to reduce the number of clock cycles required to perform a given instruction. Under this approach, instructions will execute faster and overall processor "throughput" will thereby increase, even if the clock speed remains the same. One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, for example, a processor in which each instruction executes in six stages, each stage requiring a single clock cycle to perform its function. Six separate instructions can be processed simultaneously in the pipeline, with the processing of one instruction completed during each clock cycle. Therefore, the instruction throughput of an N stage pipelined architecture is, in theory, N times greater than the throughput of a non-pipelined architecture capable of completing only one instruction every N clock cycles.

Another technique for increasing overall processor speed is "superscalar" processing. Superscalar processing calls for multiple instructions to be processed per clock cycle. Assuming that instructions are independent of one another (i.e., the execution of an instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

A cache memory is a small but very fast memory that holds a limited number of instructions and data for use by the processor. One of the most frequently employed techniques for increasing overall processor throughput is to minimize the number of cache misses and to minimize the cache access time in a processor that implements a cache memory. The lower the cache access time, the faster the processor can run. Also, the lower the cache miss rate, the less often the processor is stalled while the requested data is retrieved from main memory and the higher the processor throughput is. There is a wealth of information describing cache memories and the general theory of operation of cache memories is widely understood. This is particularly true of cache memories implemented in x86 microprocessor architectures.

Many techniques have been employed to reduce the access time of cache memories. However, the cache access time is still limited by the rate at which data can be examined in, and retrieved from, the RAM circuits that are internal to a conventional cache memory. This is in part due to the rate at which address translation devices, such as the translation look-aside buffer (TLB), translate linear (or logical) memory addresses into physical memory addresses. If the TLB has a comparatively long access time for retrieving data, then the translation of the logical memory address into a physical address is comparatively slow. The slower this translation is, the slower the cache memory is in its overall operation.

A significant portion of the latency of a cache memory and its associated TLB is the complex switching and multiplexing networks interconnecting the main cache memory and the TLB and other parts of the processor. In conventional x86 processors, the cache memory and its TLB receive addresses from a number of address generating sources within the processor. Some of the addresses are generated when the processor is operating in real mode and do not require translation by the TLB. Other addresses are generated when the processor is operating in paging enabled mode and must be translated in the TLB. Thus, there are frequently multiple paths interconnecting the same addressing generating sources with the cache memory and/or the TLB in order to service both real mode and paging mode. This results in complex switching and multiplexing gate arrays that add additional delays to the time required to translate addresses and retrieve data from the cache memory.

Therefore, there is a need in the art for improved cache memories that maximize processor throughput. There is a further need in the art for improved cache memories having a reduced access time. In particular, there is a need for improved cache memories that minimize cache latencies related to switching circuitry used to service both real mode and paging mode.

SUMMARY OF THE INVENTION

The limitations inherent in the prior art described above are overcome by an improved address translation device providing physical addresses and adapted for use in an x86-compatible processor capable of operating in real mode and paging mode and having a physically-addressable cache. In one embodiment, the address translation device comprises: 1)a tag array for storing received untranslated addresses in selected ones of N tag entries in the tag array during real mode operations and paging mode operations; and 2) a data array for storing translated physical addresses corresponding to the untranslated addresses in selected ones of N data entries in the data array, wherein the untranslated addresses stored in the tag array during real mode operations are physical addresses equal to the corresponding translated physical addresses stored in the data array.

In one embodiment of the present invention, the untranslated addresses stored in the tag array during paging mode operations are linear addresses.

In another embodiment of the present invention, the address translation device further comprises a flag array for storing mode flags corresponding to the translated physical addresses in selected ones of N flag entries in the flag array.

In still embodiment of the present invention, the mode flags indicate whether the corresponding translated physical addresses were stored in the data array during real mode operations.

In yet another embodiment of the present invention, the mode flags indicate whether the corresponding translated physical addresses were stored in the data array during paging mode operations.

In other embodiments of the present invention, the address translation device further comprises a region configuration array for storing region configuration bits corresponding to the translated physical addresses in selected ones of N region configuration entries in the region configuration array.

In further embodiments of the present invention, the address translation device is an L1 translation look-aside buffer providing is physical addresses to a Level 1 cache.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
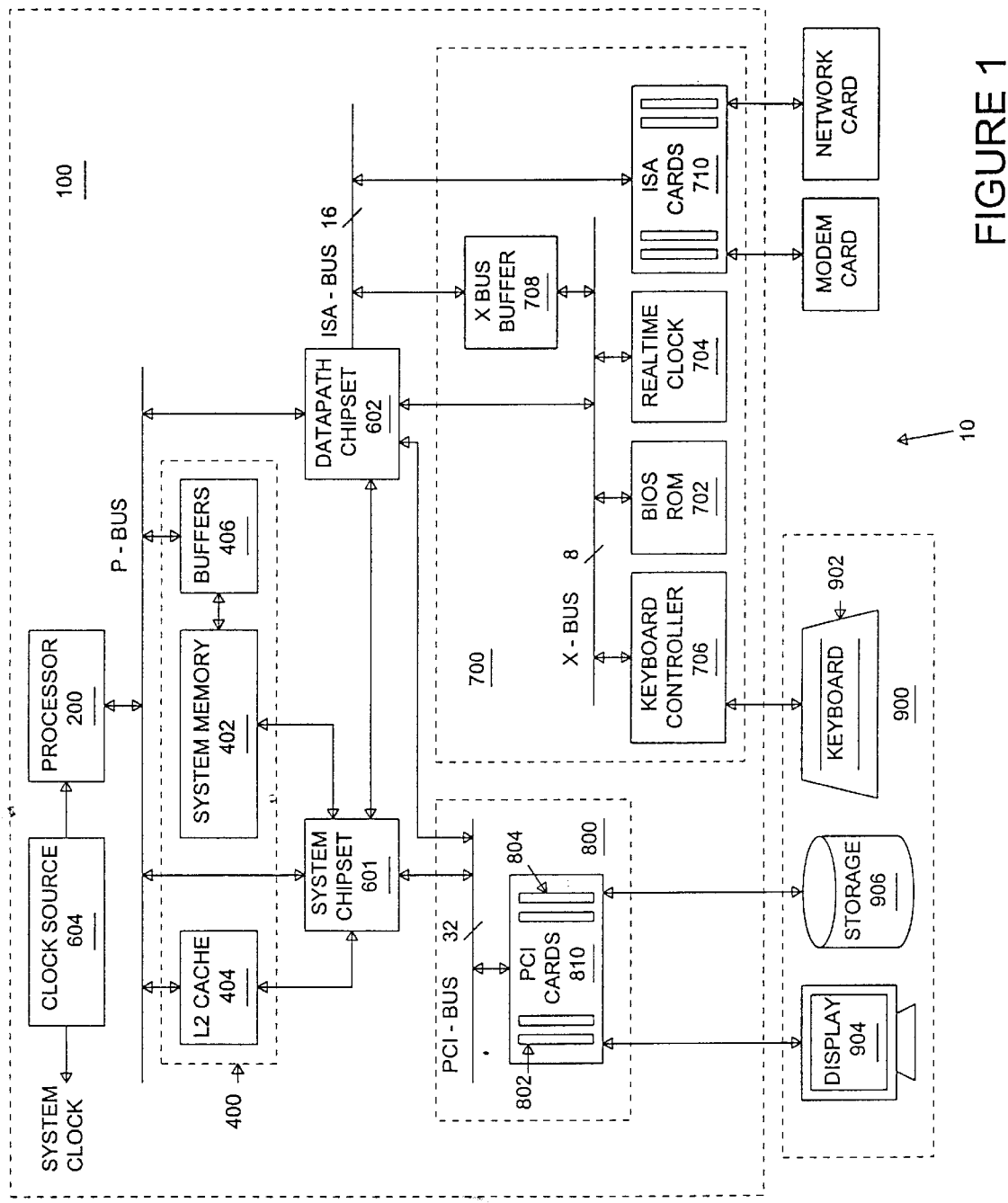
FIG. 1 is a block diagram of an exemplary system employing a processor in accordance with the principles of the present invention.

The detailed description of the preferred embodiment for the present invention is organized as follows:
1. Exemplary Computing System
2. Exemplary Processor

| | | |
|---|---|---|
| 2.1 | Core | |
| | 2.1.1 | The Integer Unit |
| | 2.1.2 | Out-of-Order Processing |
| | 2.1.3 | Pipeline Selection |
| | 2.1.4 | Register Renaming |
| | 2.1.5 | Data Forwarding |
| | | 2.1.5.1  Operand Forwarding |
| | | 2.1.5.2  Result Forwarding |
| | 2.1.6 | Data Bypassing |
| | 2.1.7 | Branch Control |
| | 2.1.8 | Speculative Execution |
| | 2.1.9 | System Register Set |
| | | 2.1.9.1  Model Specific Registers |
| | | 2.1.9.2  Debug Registers |
| | | 2.1.9.3  Test Registers |
| | 2.1.10 | The Floating Point Unit |
| 2.2 | Cache Unit | |

This organizational table, and the corresponding headings used in this detailed description, are provided for convenient reference and are not intended to limit the scope of the present invention. It should be understood that while the preferred embodiment is described below with respect to x86 computer architecture, it has general applicability to any architecture. Certain terms related to x86 computer architecture (such as register names, signal nomenclature, etc.), which are known to practitioners in the field of processor design, are not discussed in detail in order not to obscure the disclosure.

Moreover, certain structural details, which will be readily apparent to those skilled in the art, having the benefit of the description herein, have been illustrated in the drawings by readily understandable block representations and state/flow diagrams that show and describe details that are pertinent to the present invention. These illustrations do not necessarily represent the physical arrangement of the exemplary system, but are primarily intended to illustrate the major structural components in convenient functional groups, so that the present invention may be more readily understood. It is to be understood that other embodiments may be utilized and structural changes may be made without departing from the scope of the present invention.

1. EXEMPLARY COMPUTING SYSTEM—FIG. 1 is a block diagram of an exemplary computer system 10 employing a processor in accordance with the principles of the present invention. The exemplary computer system 10 comprises a system circuit board (a.k.a. motherboard) 100 and various peripherals and peripheral interfaces. Motherboard 100 comprises a processor 200 and memory subsystem 400 inter-coupled by a processor P-Bus (sometimes referred to as a CPU or local Bus). System logic circuitry interfaces the processor 200 to three conventional peripheral buses namely: X-Bus, PCI-Bus, and ISA-Bus. For the exemplary computer system, the P-Bus is compliant with the so-called "P55C socket."

System logic circuitry comprises a system chipset 601 and a datapath chipset 602 (sometimes referred to as a North-Bridge and South-Bridge, respectively), as well as an external clock source 604 that provides an external clock input to the processor 200 and a system clock signal to the remainder of the motherboard 100. The external clock source 604 may take on many forms without departing from the scope of the present invention, including a digital or analog phase-locked loop or delay line loop circuitry. The exact details are not necessary for understanding the present invention.

Processor 200 and the memory subsystem 400 reside on the P-Bus. The only other direct connections to the P-Bus are the system chipset 601 and the datapath chipset 602. According to the exemplary division of system logic functions, the system chipset 601 interfaces to a conventional 32-bit PCI-Bus, while the datapath chipset 602 interfaces to the 16-bit ISA-Bus and the internal 8-bit X-Bus. In alternative embodiments, a special Advanced Graphics Port (AGP) may provide an interface between the P-Bus and a graphics accelerator.

Processor 200 is coupled over the P-Bus to L2 (level 2) cache 404 and through data buffers 406 to system memory 402 (DRAM). The system chipset 601 includes control circuitry for the P-Bus, system memory 402, and the L2 cache 404. The datapath chipset 602 also interfaces to the conventional X-Bus. The X-Bus is an internal 8-bit bus that couples to the BIOS ROM 702 and the real-time clock (RTC) 704. In addition, the X-Bus connects to a conventional 8-bit keyboard controller 706.

The system and datapath chipsets 601 and 602 provide interface control for the 16-bit ISA-Bus and the 32-bit PCI-Bus. The ISA-Bus maintains compatibility with industry standard peripherals via ISA-compliant peripheral card slots 710. The PCI-Bus provides a higher performance peripheral interface via PCI-compliant peripheral card slots 810 for selected peripherals, such as a video/graphics card 802 and a storage controller 804 (which may be included as part of the system chipset 601) for interfacing to mass storage 906.

The motherboard 100 is coupled to external peripherals 900, such as keyboard 902, display 904, and mass storage 906 through the PCI-, ISA-, and X-Buses. Network and modem interconnections are provided as ISA cards, but it is to be understood that they could also be provided as PCI cards.

Figure 2:
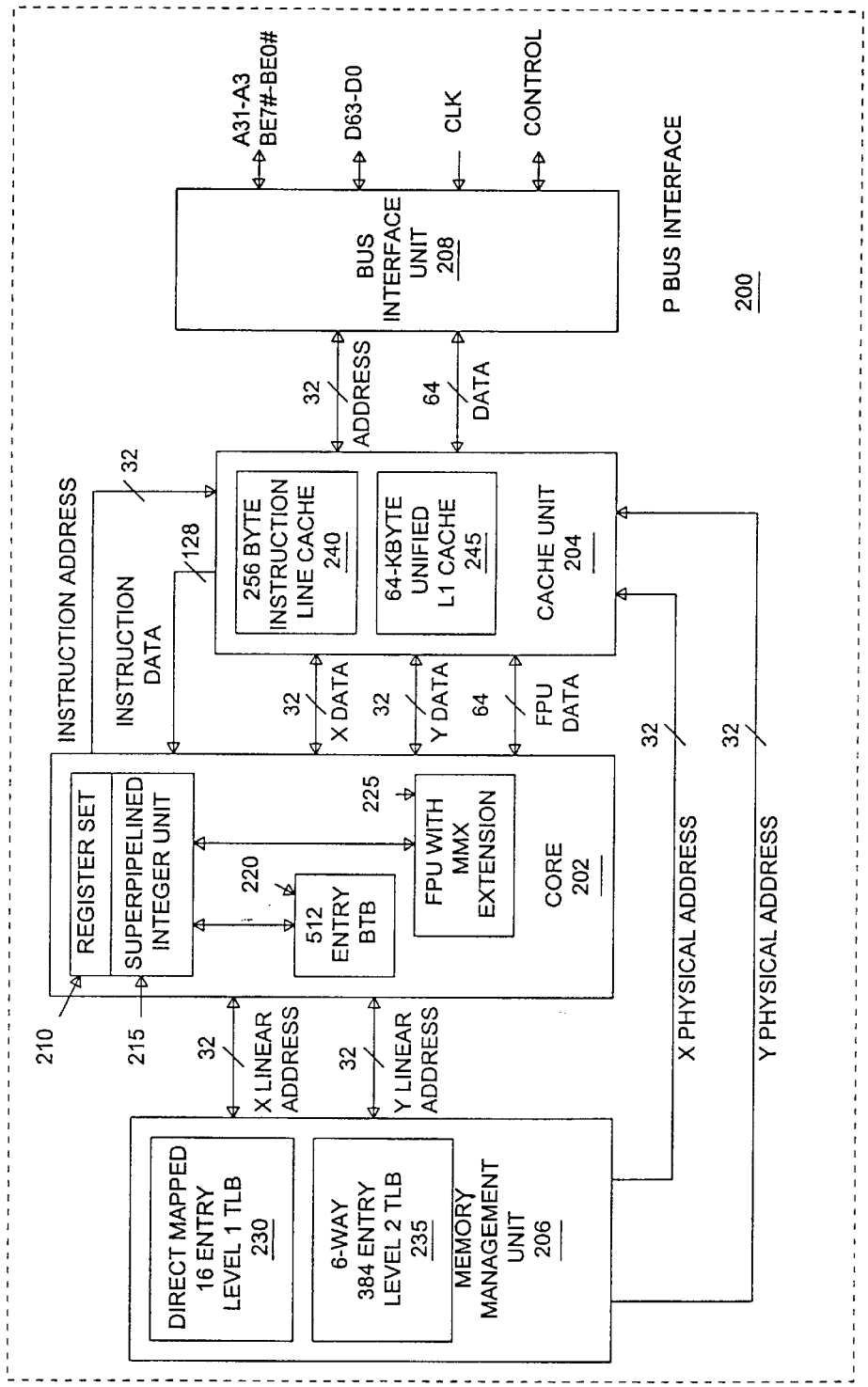
FIG. 2 is a more detailed block diagram of the processor depicted in FIG. 1, which employs cache line locking in accordance with the principles of the present invention.

2. EXEMPLARY PROCESSOR—FIG. 2 is a more detailed block diagram of the processor 200 depicted in FIG. 1, which employs cache line locking in accordance with the principles of the present invention. It is to be understood that other forms of the processor 200 may be utilized and other modifications can be made without departing from the scope and spirit of the present invention. The processor 200 consists of four major functional blocks, namely: 1) core 202, 2) cache unit 204, 3) memory management unit (MMU) 206, and 4) bus interface unit (BIU) 208.

2.1 CORE—The core 202 comprises a super-pipelined integer unit (IU) 215, a branch target buffer (BTB) 220, and a floating point unit (FPU) 225. The cache unit 204 comprises a 64 Kbyte unified L1 cache 245 that stores the most recently used data and instruction code and a 256 byte instruction line cache 240 that only stores instruction code. The MMU 206 preferably comprises two translation look-aside buffers (TLBs): a main level one (L1) TLB 230 and a larger level two (L2) TLB 235. The L1 TLB 230 is preferably direct mapped and has 16 entries, each entry holding one line of 42 bits. The L2 TLB 235 is preferably 6-way associative and has 384 entries to hold 384 lines.

The MMU 206 translates linear (or logical) addresses supplied by the IU 215 into physical addresses, including addresses based on paging, for use by the unified L1 cache 245 and for transmission through the BIU 208. Memory management procedures are preferably x86 compatible, adhering to standard paging mechanisms. The Page Table Entry (PTE) is stored in either the unified L1 cache in the Cache Unit 204, the L2 cache 404, or in system memory 404.

The Bus Interface Unit (BIU) provides the P-Bus interface. During a memory cycle, a memory location is selected through the address lines (A31–A3 and BE7#–BE0#) on the P-Bus. Data is passed to/from memory through the data lines (D63-D0) on the P-Bus.

The core 202 requests instructions from the cache unit 204. The received integer instructions are decoded by either the X-processing pipeline or Y-processing pipeline within the super-pipelined IU 215. If the instruction is a multimedia extension or FPU instruction, the instruction is passed to the FPU 225 for processing. As required, data is fetched from the 64 Kbyte unified L1 cache 245. If the data is not in the unified L1 cache 245, the data is accessed via the BIU 208 from either the L2 cache 404 or system memory 402.

Figure 3:
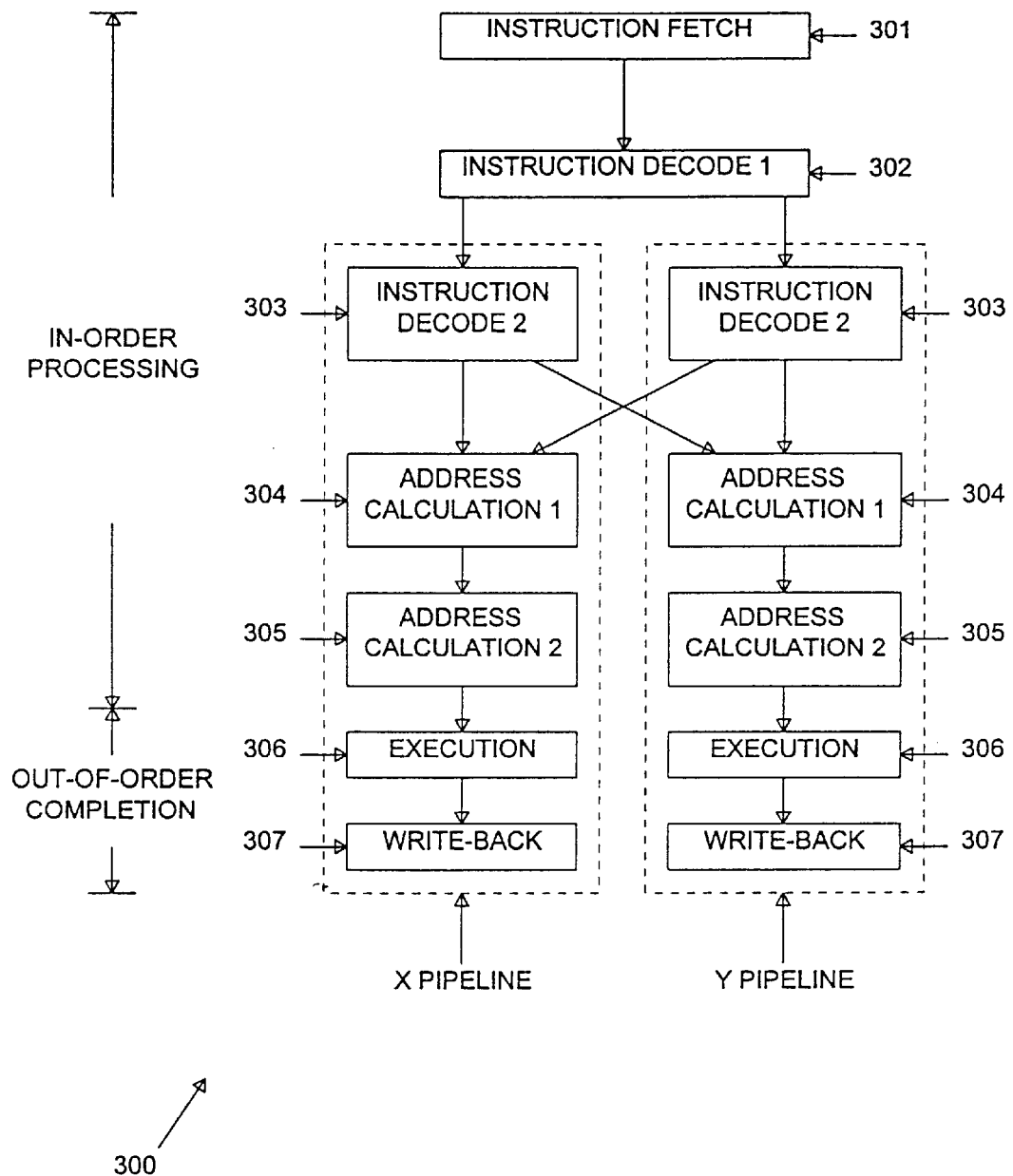
FIG. 3 is a more detailed block diagram of the pipelined stages of the Integer Unit depicted in FIG. 2.

2.1.1 THE INTEGER UNIT—FIG. 3 is a more detailed block diagram of the pipelined stages of the integer unit 215 depicted in FIG. 2. Parallel instruction execution is provided by two seven-stage integer pipelines, referred to as the X-pipeline and the Y-pipeline. Each of the X- and Y-pipelines can process several instructions simultaneously. The IU 215 comprises the following pipeline stages: Instruction Fetch (IF) 301, Instruction Decode 1 (ID1) 302, Instruction Decode 2 (ID2) 303, Address Calculation 1 (AC1) 304, Address Calculation 2 (AC2) 305, Execution 306, and Write-Back 307.

The IF 301 stage, shared by both the X- and Y-pipelines, fetches 16 bytes of code from the cache unit 204 in a single clock cycle. Within the IF 301 stage, the code stream is checked for any branch instructions that could affect normal program sequencing. If an unconditional or conditional branch is detected, branch prediction logic within the IF 301 stage generates a predicted target address for the instruction. The IF 301 stage then begins fetching instructions at the predicted address.

The super-pipelined Instruction Decode stage comprise the ID1 302 substage and ID2 303 substage. ID1, shared by both X- and Y-pipelines, evaluates the code stream provided by the IF 301 stage and determines the number of bytes in each instruction. Up to two instructions per clock are delivered to the ID2 substages, one in each pipeline.

The ID2 303 substage decodes instructions and sends the decoded instructions to either the X- or Y-pipeline for execution. The particular pipeline is chosen, based on which instructions are already in each pipeline and how fast they are expected to flow through the remaining pipe-line stages.

The Address Calculation stage comprises the AC1 304 sub-stage and the AC2 305 substage. If the instruction refers to a memory operand, the AC1 substage calculates a linear memory address for the instruction. The AC2 substage performs any required memory management functions, cache accesses, and register file accesses. If a floating point instruction is detected by the AC2 substage, the instruction is sent to the FPU 225 for processing. The Execution 306 stage executes instructions using the operands provided by the address calculation stage. The Write-Back 307 stage stores execution results either to a register file within the IU 215 or to a write buffer in the cache control unit.

2.1.2 OUT-OF-ORDER PROCESSING—If an instruction executes faster than the previous instruction in the other pipeline, the instructions may complete out of order. All instructions are processed in order, up to the Execution 306 stage. While in the Execution 306 and Write-Back 307 stages, instructions may be completed out of order. If there is a data dependency between two instructions, hardware interlocks are enforced to ensure correct program execution. Even though instructions may complete out of order, exceptions and writes resulting from the instructions are always issued in program order.

2.1.3 PIPELINE SELECTION—In most cases, instructions are processed in either pipeline and without pairing constraints on the instructions. However, certain instructions are preferably processed only in the X-pipeline, such as branch, floating point, and exclusive instructions. Branch and floating point instructions may be paired with a second instruction in the Y-pipeline. Exclusive instructions (e.g., protected mode segment loads, special control, debug, and test register accesses, string instructions, multiply and divide, I/O port accesses, push all and pop all, and inter-segment jumps, calls, and returns), which typically require multiple memory accesses, are preferably not paired with instructions in the Y-pipeline. Although exclusive instructions are not paired, hardware from both pipelines is used to accelerate instruction completion.

When two instructions that are executing in parallel require access to the same data or register, one of the following types of data dependencies may occur: Read-After-Write (RAW), Write-After-Read (WAR), and Write-After-Write (WAW). Data dependencies typically force serial execution of instructions. However, the processor 200 employs register renaming, data forwarding, and data bypassing mechanisms that allow parallel execution of instructions containing data dependencies.

2.1.4 REGISTER RENAMING—The processor 200 includes a register file containing 32 physical general purpose registers, each of which can be temporarily assigned as one of the general purpose registers defined by the x86 architecture (EAX, EBX, ECX, EDX, ESI, EDI, EBP, and ESP). For each register write operation, a new physical register is selected to allow previous data to be retained temporarily—effectively removing WAW and WAR dependencies. The programmer does not have to consider register renaming, since register renaming is completely transparent to both the operating system and application software.

A WAR dependency exists when the first in a pair of instructions reads a logical register, and the second instruction writes to the same logical register. This type of dependency is illustrated by the pair of instructions shown below. In this and the following examples the original instruction order is shown in parentheses.

| X-PIPELINE | Y-PIPELINE |
|---|---|
| (1) MOV BX, AX | (2) ADD AX, CX |
| BX ← AX | AX ← AX + CX |

In the absence of register renaming, the ADD instruction in the Y-pipeline would have to be stalled to allow the MOV instruction in the X-pipeline to read the AX register. The processor 200, however, can avoid the Y-pipeline stall, as shown below in Table 1. As each instruction executes, the results are placed in new physical registers to avoid the possibility of overwriting a logical register value and to allow the two instructions to complete in parallel (or out of order) rather than in sequence.

TABLE 1

Register Renaming with WAR Dependency

| Instruction | Physical Register Contents | | | | | Pipe | Action |
| | Reg0 | Reg1 | Reg2 | Reg3 | Reg4 | | |
|---|---|---|---|---|---|---|---|
| (Initial) | AX | BX | CX | | | | |
| MOV BX,AX | AX | | CX | BX | | X | Reg3 ← Reg0 |
| ADD AX,CX | | | CX | BX | AX | Y | Reg4 ← Reg0 + Reg2 |

The representations of the MOV and ADD instructions in the final column of Table 1 are completely independent.

A WAW dependency occurs when two consecutive instructions perform write operations to the same logical register. This type of dependency is illustrated by the pair of instructions shown below:

| X-PIPELINE | Y-PIPELINE |
|---|---|
| (1) ADD, AX, BX | (2) MOV AX, [mem] |
| AX ← AX + BX | AX ← [mem] |

Without register renaming, the MOV instruction in the Y-pipeline would have to be stalled to guarantee that the ADD instruction in the X-pipeline would first write its results to the AX register. The processor 200, however, can avoid the Y-pipeline stall, as shown below in Table 2. The contents of the AX and BX registers are placed in physical registers. As each instruction executes, the results are placed in new physical registers to avoid the possibility of overwriting a logical register value and to allow the two instructions to complete in parallel (or out of order) rather than in sequence. All subsequent reads of the logical register AX will refer to Reg3, the result of the MOV instruction.

TABLE 2

Register Renaming with WAW Dependency

| Instruction | Physical Register Contents | | | | Pipe | Action |
| --- | --- | --- | --- | --- | --- | --- |
| | Reg0 | Reg1 | Reg2 | Reg3 | | |
| (Initial) | AX | BX | | | | |
| ADD AX, BX | | BX | AX | | X | Reg2 ← Reg0 + Reg1 |
| MOV AX, [mem] | | BX | | AX | Y | Reg3 ← [mem] |

2.1.5 DATA FORWARDING—The processor 200 uses two types of data forwarding in conjunction with register renaming to eliminate RAW dependencies, namely, operand forwarding and result forwarding. Operand forwarding takes place when the first in a pair of instructions performs a move from register or memory, and the data that is read by the first instruction is required by the second instruction. The processor performs the read operation and makes the data read available to both instructions simultaneously. Result forwarding takes place when the first in a pair of instructions performs an operation (such as an ADD) and the result is required by the second instruction to perform a move to a register or memory. The processor 200 performs the required operation and stores the results of the operation to the destination of both instructions simultaneously.

2.1.5.1 OPERAND FORWARDING—A RAW dependency occurs when the first in a pair of instructions performs a write, and the second instruction reads the same register. This type of dependency is illustrated by the pair of instructions shown below in the X- and Y-pipelines:

| X-PIPELINE | Y-PIPELINE |
| --- | --- |
| (1) MOV AX, [mem] | (2) ADD BX, AX |
| AX ← [mem] | BX ← AX + BX |

The processor 200, however, can avoid the Y-pipeline stall, as shown below in Table 3. Operand forwarding allows simultaneous execution of both instructions by first reading memory and then making the results available to both pipelines in parallel. Operand forwarding can only occur if the first instruction does not modify its source data. In other words, the instruction is a move type instruction (for example, MOV, POP, LEA). Operand forwarding occurs for both register and memory operands. The size of the first instruction destination and the second instruction source must match.

TABLE 3

Example of Operand Forwarding

| Instruction | Physical Register Contents | | | | Pipe | Action |
| --- | --- | --- | --- | --- | --- | --- |
| | Reg0 | Reg1 | Reg2 | Reg3 | | |
| (Initial) | AX | BX | | | | |
| MOV AX, [mem] | | BX | AX | | X | Reg2 ← Reg2 + [mem] |
| MOV AX, [mem] | | | AX | BX | Y | Reg3 ← [mem] + Reg1 |

2.1.5.2 RESULT FORWARDING—A RAW dependency can occur when the first in a pair of instructions performs a write, and the second instruction reads the same register. This dependency is illustrated by the pair of instructions in the X- and Y-pipelines, as shown below:

| X-PIPELINE | Y-PIPELINE |
| --- | --- |
| (1) ADD AX, BX | (2) MOV [mem], AX |
| AX ← AX + BX | [mem] ← AX |

The processor 200, however, can use result forwarding to avoid the Y-pipeline stall, as shown below in Table 4. Instead of transferring the contents of the AX register to memory, the result of the previous ADD instruction (Reg0+Reg1) is written directly to memory, thereby saving a clock cycle. The second instruction must be a move instruction and the destination of the second instruction may be either a register or memory.

TABLE 4

Result Forwarding Example

| Instruction | Physical Register Contents | | | Pipe | Action |
| --- | --- | --- | --- | --- | --- |
| | Reg0 | Reg1 | Reg2 | | |
| (Initial) | AX | BX | | | |
| ADD AX, BX | | BX | AX | X | Reg2 ← Reg0 + Reg1 |
| MOV [mem], AX | | BX | AX | Y | [mem] ← Reg0 + Reg1 |

2.1.6 DATA BYPASSING—In addition to register renaming and data forwarding, the processor 200 provides a third data dependency-resolution technique called data bypassing. Data bypassing reduces the performance penalty of those memory data RAW dependencies that cannot be eliminated by data forwarding. Data bypassing is provided when the first in a pair of instructions writes to memory and the second instruction reads the same data from memory. The processor retains the data from the first instruction and passes it to the second instruction, thereby eliminating a memory read cycle. Data bypassing only occurs for cacheable memory locations.

A RAW dependency occurs when the first in a pair of instructions performs a write to memory and the second instruction reads the same memory location. This dependency is illustrated by the pair of instructions in the X- and Y-pipelines, as shown below.

| X-PIPELINE | Y-PIPELINE |
|---|---|
| (1) ADD [mem], AX | (2) SUB BX, [mem] |
| [mem] ← [mem] + AX | BX ← BX − [mem] |

The processor 200 can use data bypassing to stall the Y-pipeline for only one clock cycle by eliminating the Y-pipeline's memory read cycle, as shown below in Table 5. Instead of reading memory in the Y-pipeline, the result of the previous instruction ([mem]+Reg0) is used to subtract from Reg1, thereby saving a memory access cycle.

TABLE 5

Example of Data Bypassing

Physical Register Contents

| Instruction | Reg0 | Reg1 | Reg2 | Pipe | Action |
|---|---|---|---|---|---|
| (Initial) | AX | BX | | | |
| ADD [mem], AX | AX | BX | | X | [mem] ← [mem] + Reg0 |
| SUB BX, [mem] | AX | | BX | Y | Reg2 ← Reg1 − { [mem] + Reg0 } |

2.1.7 BRANCH CONTROL—Programmers have found through simulation and experimentation that branch instructions occur on average every four to six instructions in x86-compatible programs. The processor 200 minimizes performance degradation and latency of branch instructions through the use of branch prediction and speculative execution. The processor 200 uses a 512-entry, 4-way set associative Branch Target Buffer (BTB) 220 to store branch target addresses and a 1024-entry branch history table. During the fetch stage, the instruction stream is checked for the presence of branch instructions. If an unconditional branch instruction is encountered, the processor 200 accesses the BTB 220 to check for the branch instruction's target address. If the branch instruction's target address is found in the BTB 220, the processor 200 begins fetching at the target address specified by the BTB 220.

In case of conditional branches, the BTB 220 also provides history information to indicate whether the branch is more likely to be taken or not taken. If the conditional branch instruction is found in the BTB 220, the processor 200 begins fetching instructions at the predicted target address. If the conditional branch misses in the BTB 220, the processor 200 predicts that the branch will not be taken, and instruction fetching continues with the next sequential instruction. The decision to fetch the taken or not taken target address is preferably, although not necessarily, based on a four-state branch prediction algorithm.

Once fetched, a conditional branch instruction is first decoded and then dispatched to the X-pipeline only. The conditional branch instruction proceeds through the X-pipeline and is then resolved in either the Execution 306 stage or the Write-Back 307 stage. The conditional branch is resolved in the Execution 306 stage if the instruction responsible for setting the condition codes is completed prior to the execution of the branch. If the instruction that sets the condition codes is executed in parallel with the branch, the conditional branch instruction is resolved in the Write-Back 307 stage.

Correctly predicted branch instructions execute in a single core clock cycle. If resolution of a branch indicates that a misprediction has occurred, the processor 200 flushes the pipeline and starts fetching from the correct target address.

The processor 200 preferably prefetches both the predicted and the non-predicted path for each conditional branch, thereby eliminating the cache access cycle on a misprediction. If the branch is resolved in the Execution 306 stage, the resulting misprediction latency is four clock cycles. If the branch is resolved in the Write-Back 307 stage, the latency is five clock cycles.

Since the target address of return (RET) instructions is dynamic rather than static, the processor 200 caches target addresses for RET instructions in an eight-entry return stack rather than in the BTB 220. The return address is pushed on the return stack during a CALL instruction and popped during the corresponding RET instruction.

2.1.8 SPECULATIVE EXECUTION—The processor 200 is capable of speculative execution following a floating point instruction or predicted branch. Speculative execution allows the X- and Y-pipelines to continuously execute instructions following a branch without stalling the pipelines waiting for branch resolution. As will be described below, the same mechanism is used to execute floating point instructions in parallel with integer instructions. The processor 200 is capable of up to four levels of speculation (i.e., combinations of four conditional branches and floating point operations). After generating the fetch address using branch prediction, the processor 200 checkpoints the machine state (registers, flags, and processor environment), increments the speculation level counter, and begins operating on the predicted instruction stream.

Once the branch instruction is resolved, the processor 200 decreases the speculation level. For a correctly predicted branch, the status of the checkpointed resources is cleared. For a branch misprediction, the processor 200 generates the correct fetch address and uses the checkpointed values to restore the machine state in a single clock. In order to maintain compatibility, writes that result from speculatively executed instructions are not permitted to update the cache or external memory until the appropriate branch is resolved. Speculative execution continues until one of the following conditions occurs: 1) a branch or floating point operation is decoded and the speculation level is already at four; 2) an exception or a fault occurs; 3) the write buffers are full; or 4) an attempt is made to modify a non-checkpointed resource (i.e., segment registers, system flags).

2.1.9 SYSTEM REGISTER SET—Registers are broadly grouped into two sets, namely: 1) the application register set comprising registers frequently used by application programs, and 2) the system register set comprising registers typically reserved for use by operating system programs. The application register set preferably includes general purpose registers, segment registers, a flag register, and an instruction pointer register. The system register set preferably includes control registers, system address registers, debug registers, configuration registers, and test registers. In order not to obscure the invention, only relevant portions of the system register set will be further described. Those skilled in the art may easily obtain additional descriptions of the application register set by referring to publications such as "The Cyrix 6x86MX Microprocessor Data Book," Order No. 94329-00, May 1997, herein incorporated by reference.

Figure 4A:
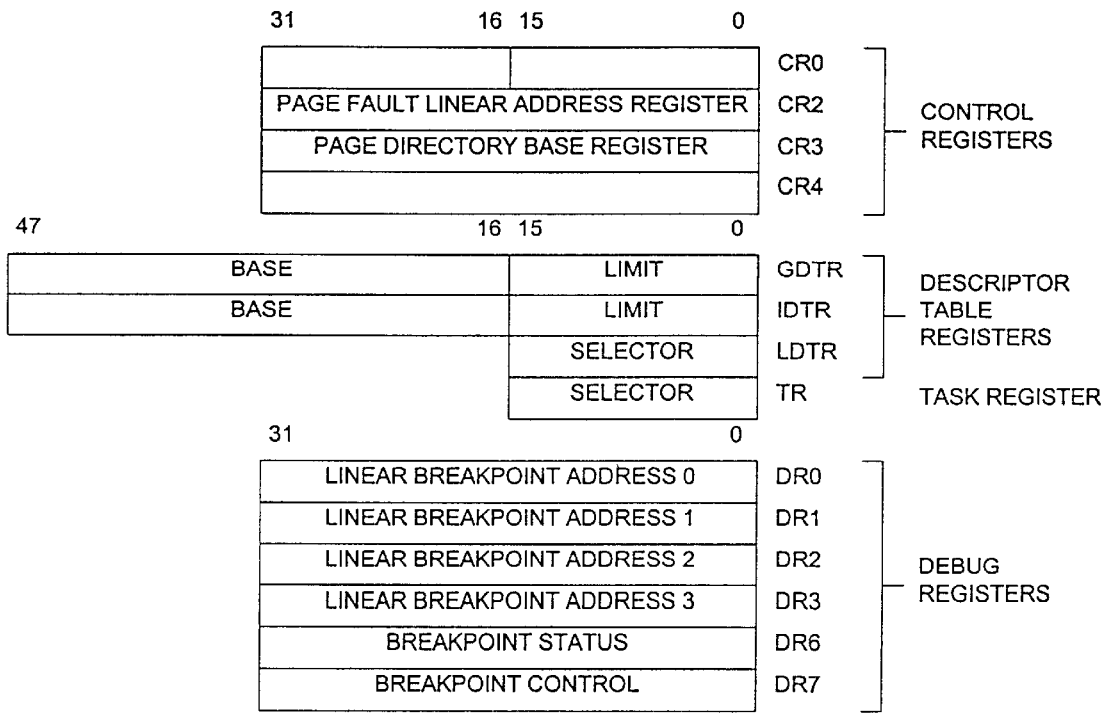
FIGS. 4A and 4B depict a preferred system register set, comprising registers not generally visible to application programmers and typically employed by operating systems and memory management programs.
Figure 4B:
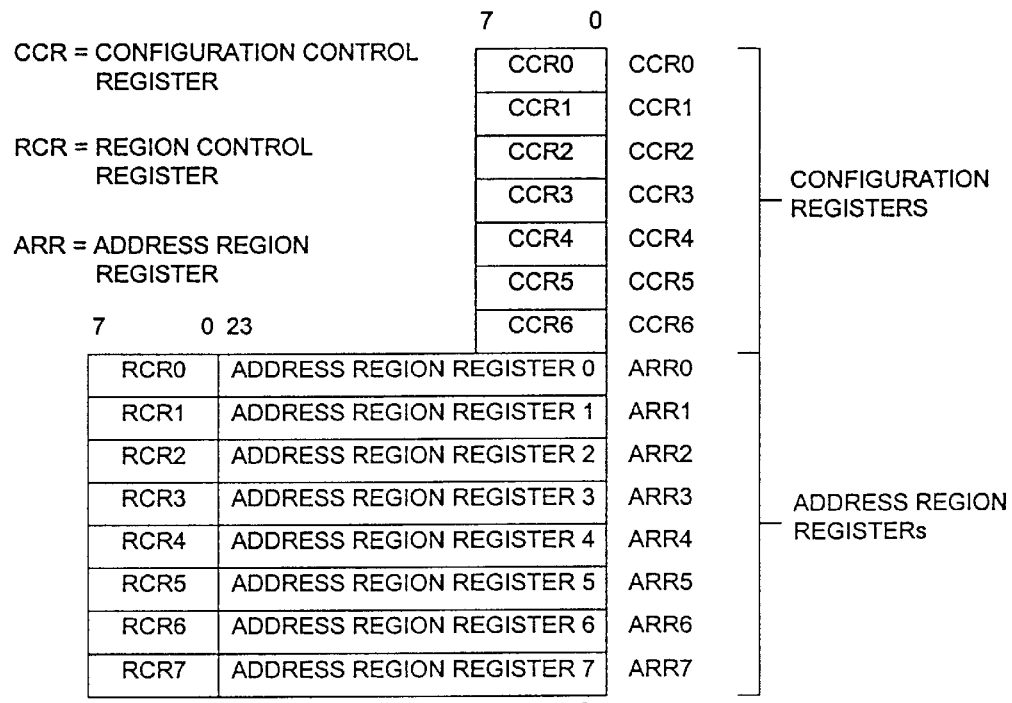
Figure 4B:
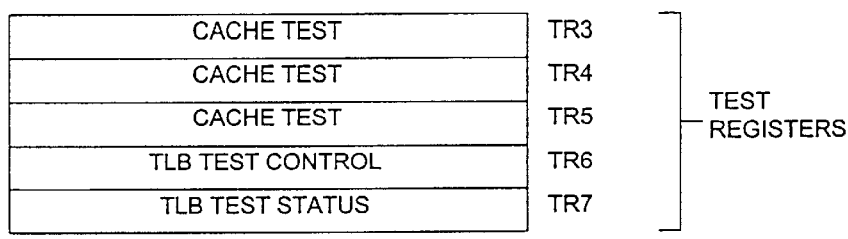
Figure 4B:

FIGS. 4A and 4B depict a preferred system register set 400, comprising registers not generally visible to application programmers and typically employed by operating systems and memory management programs. The control registers, CR0–CR4, control certain aspects of the processor 200 such as paging, coprocessor functions, and segment protection. The debug registers, DR0–DR7, provide debugging facilities to enable the use of data access break-points and code execution breakpoints. The test registers, TR3–TR7, provide a mechanism to test the contents of both the cache unit 204 and the Translation Look-Aside Buffers, TLB 230 and TLB 235. The configuration control registers, CCR0–CCR7, are used to configure the processor 200's on-chip cache operations, power management features, and System Management Mode, as well as provide information on device type and revision.

The address region registers, ARR0–ARR7, are used to specify the location and size for the eight address regions. Attributes for each address region are specified in the region control registers, RCR0–RCR7, ARR7 and RCR7 are used to define system main memory and differ from ARR0–ARR6 and RCR0–RCR6. With non-cacheable regions defined on-chip, the processor 200 eliminates data dependencies and resource conflicts in its execution pipelines. If KEN# is active for accesses to regions defined as non-cacheable by the RCRs, the region is not cached.

A register index, is used to select one of three bytes in each ARRx. The starting address of the ARRx address region, selected by the START ADDRESS field, must be on a block size boundary. For example, a 128 Kbyte block is allowed to have a starting address of 0 Kbytes, 128 Kbytes, 256 Kbytes, and so on.

The region control registers, RCR0–RCR7, specify the attributes associated with the ARRx address regions. Cacheability, weak locking, write gathering, and cache-write-through policies can be activated or deactivated using the attribute bits defined in the region control registers.

2.1.9.1 MODEL SPECIFIC REGISTERS—The processor 200 preferably comprises at least four model specific registers (MSRs). The MSRs can be read using the RDMSR instruction. During a register read, the contents of the particular MSR, specified by the ECX register, is loaded into the EDX:EAX registers. The MSR can be written using the WRMSR instruction. During a MSR write the contents of EDX:EAX are loaded into the MSR specified in the register.

2.1.9.2 DEBUG REGISTERS—At least six debug registers, DR0–DR3, DR6 and DR7, support debugging on the processor 200. Memory addresses loaded in the debug registers, referred to as "breakpoints," generate a debug exception when a memory access of the specified type occurs to the specified address. A data breakpoint can be specified for a particular kind of memory access, such as a read or a write. Code breakpoints can also be set allowing debug exceptions to occur whenever a given code access (execution) occurs. The size of the debug target can be set to 1, 2, or 4 bytes. The debug registers are accessed via MOV instructions, which can be executed only at privilege level 0. The Debug Address Registers (DR0–DR3) each contain the linear address for one of four possible breakpoints. Each breakpoint is further specified by bits in the Debug Control Register (DR7). For each breakpoint address in DR0–DR3, there are corresponding fields L, R/W, and LEN in DR7 that specify the type of memory access associated with the breakpoint.

The R/W field can be used to specify instruction execution as well as data access break-points. Instruction execution breakpoints are always taken before execution of the instruction that matches the breakpoint.

The Debug Status Register (DR6) reflects conditions that were in effect at the time the debug exception occurred. The contents of the DR6 register are not automatically cleared by the processor 200 after a debug exception occurs and, therefore, should be cleared by software at the appropriate time. Code execution breakpoints may also be generated by placing the breakpoint instruction (INT 3) at the location where control is to be regained. Additionally, the single-step feature may be enabled by setting the TF flat in the EFLAGS register. This causes the processor to perform a debug exception after the execution of every instruction.

2.1.9.3 TEST REGISTERS—The test registers can be used to test the unified L1 cache 245, the L1 TLB 230, and the L2 TLB 235. Test registers TR3, TR4, and TR5 are used to test the unified L1 cache 245 and TR6 and TR7 are used to test the L1 TLB 230 and the L2 TLB 235. Use of these test registers is described in more detail below.

2.1.10 FLOATING POINT UNIT—The floating point unit (FPU) 225 processes floating point and multimedia extension instructions and is preferably x87 instruction set compatible, adhering to the IEEE-754 standard. Floating point instructions may execute in parallel with integer instructions. Integer instructions may complete out-of-order with respect to the FPU instructions. The processor 200 maintains x86 compatibility by signaling exceptions and issuing write cycles in program order. Floating point instructions are preferably dispatched to the X-pipeline in the IU 215. The address calculation stage of the X-pipeline checks for memory management exceptions and accesses memory operands used by the FPU 225. If no exceptions are detected, the state of the processor 200 is check-pointed and, during AC2, floating point instructions are dispatched to a FPU instruction queue. The processor 200 can then complete subsequent integer instructions speculatively and out-of-order relative to the FPU instruction and relative to any potential FPU exceptions which may occur.

As additional FPU instructions enter the pipeline, the processor 200 can preferably dispatch four or more FPU instructions to the FPU instruction queue. The processor 200 continues executing speculatively and out-of-order, relative to the FPU queue, until one of the conditions that causes speculative execution to halt is encountered. As the FPU 225 completes instructions, the speculation level decreases and the check-pointed resources are available for reuse in subsequent operations. The FPU 225 preferably has a set of six or more write buffers to prevent stalls due to speculative writes.

Figure 5:
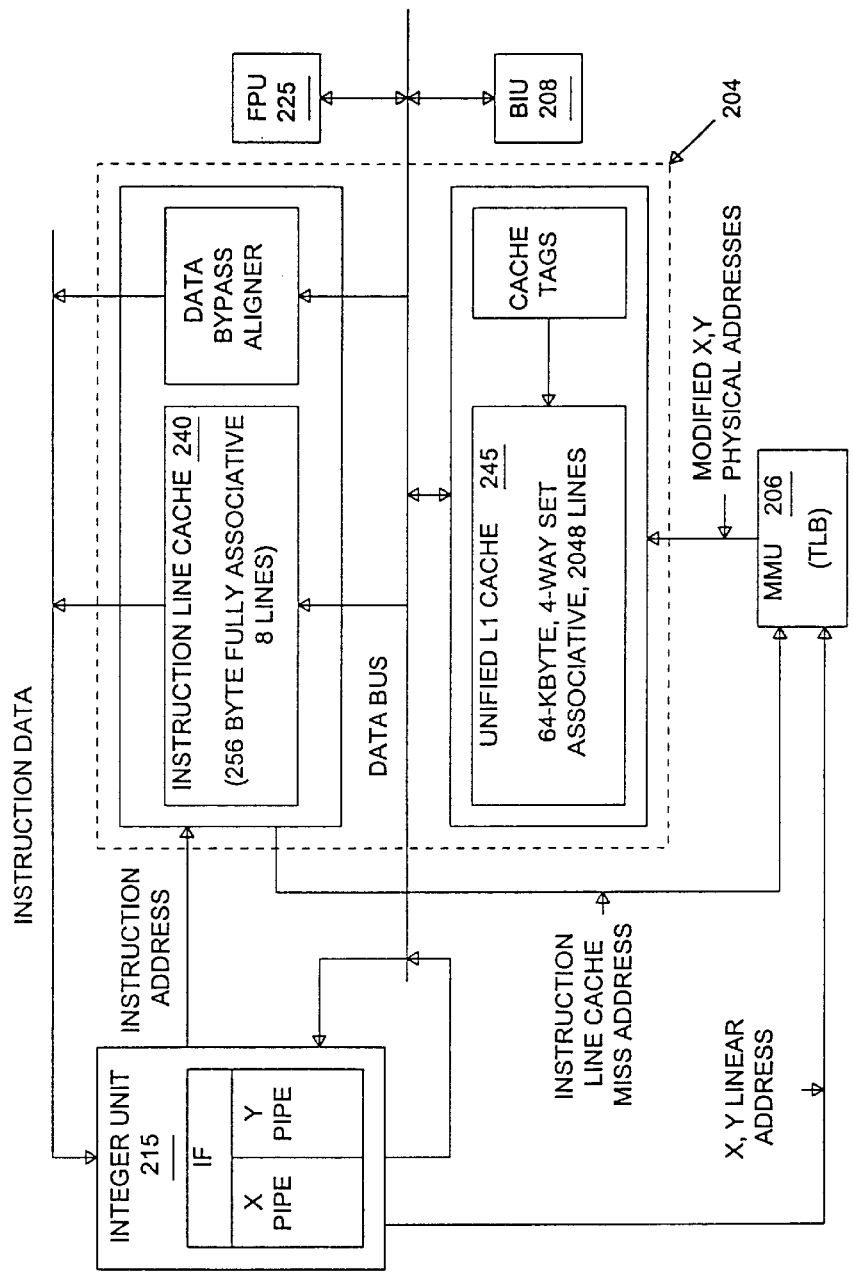
FIG. 5 depicts an exemplary cache unit in accordance with the principles of the present invention.

2.2 CACHE UNIT—FIG. 5 depicts an exemplary cache unit 204 in accordance with the principles of the present invention. Those skilled in the art will readily understand that other organizations, sizes and associativities for the cache unit 204 are possible, for which the principles of the present invention may be practiced without departing from the scope of the invention. The cache unit 204 comprises a unified L1 cache 245 and an instruction line cache 240. The unified L1 cache 245 is the primary data cache and secondary instruction cache. The unified L1 cache 245 is preferably, although not exclusively, 64 Kbytes in size and four-way set-associative with a 32 byte line size (2048 lines total).

The instruction line cache 240 is the primary instruction cache, provides a high speed instruction stream to the IU 215, and is preferably, though not exclusively, 256 bytes in size and fully associative. The instruction line cache 240 is filled from the unified L1 cache 245 through the data bus. Fetches from the IU 215 that hit in the instruction line cache 240 do not access the unified L1 cache 245. If an instruction line cache miss occurs, the instruction line data from the unified L1 cache 245 is transferred simultaneously to the instruction line cache 240 and the IU 215. The instruction line cache 240 uses a pseudo-LRU replacement algorithm. To ensure proper operation in the case of self-modifying code, any writes to the unified L1 cache 245 are checked against the contents of the instruction line cache 240. If a hit occurs in the instruction line cache 240, the appropriate line is invalidated.

Figure 6:
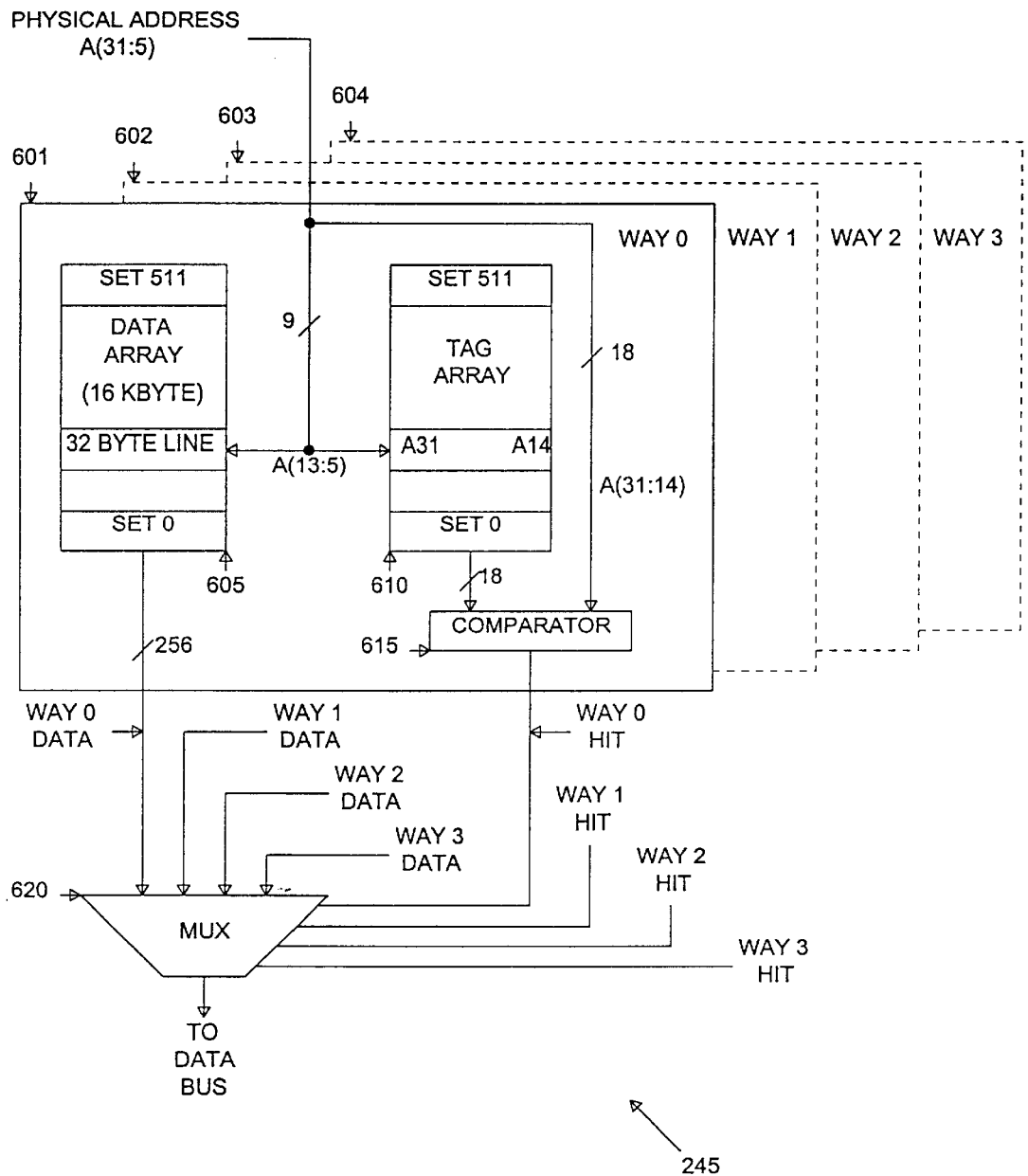
FIG. 6 depicts the exemplary L1 cache in FIG. 2 in greater detail.

FIG. 6 depicts the exemplary L1 cache 245 in FIG. 2 in greater detail. It is recalled that the exemplary L1 cache 245 preferably contains 64 Kbytes of data subdivided into 2048 cache lines of 32 bytes each. The L1 cache 245 is also organized as 512 sets, Sets 0–511, that are divided into four ways, Ways 0–3. Blocks 601–604 in L1 cache 245 comprise Ways 0–3, respectively. Ways 1–3, shown in dotted outline, are functionally equivalent to Way 0. This being the case, only Way 0 need be discussed to explain cache hits and cache misses and the retrieval of data from L1 cache 245.

Each set consists of eight entries: an address tag and a 32-byte cache line from each of the four ways. For example, if address bits A(13:5) are 000000000, Set 0 is being addressed and, in all four ways, a corresponding 32-byte line in data array 605 and a corresponding address tag in tag array 610 are accessed.

Twenty seven physical address bits, A(31:5), are needed to fetch data from the L1 cache 245. Since data are written to, and read from, the L1 cache 245 in entire 32-byte cache lines, the five least significant address bits, A(4:0), are not used. Address bits A(4:0) may be used to address individual bytes within a cache line.

Data must be fetched from the L1 cache 245 (and the external L2 cache 404) using physical addresses. Therefore, address translation is necessary. As explained above, address calculation proceeds in two steps, AC1 and AC2. The lowest twelve (12) address bits, A(11:0), are the page offset and are the same in both the linear and physical addresses. These bits do not require translation. The upper twenty bits, A(31:12), of the linear (or logical) address identify the required 4096 byte page and require translation. Since address bits A(11:0) do not require translation, they are available during AC1 for accessing data in L1 cache 245. Address bits A(31:12) are translated during AC2 and translated bits A12 and A13 become available last.

The linear (or logical) addresses are translated into physical addresses in a TLB (such as the TLB 230 or TLB 235 of FIG. 2). In one embodiment of the present invention, two TLBs are implemented: a 16 entry direct mapped L1 TLB 230 and a 384 entry 6-way associative L2 TLB 235 (again, both of FIG. 2). Each TLB compares some of linear address bits A(31:12) of the current linear address to linear address bits previously stored in the TLB. If a match is found, the corresponding physical address is output from the TLB to the L1 cache 245 and/or the L2 cache 404.

Address bits A(13:5) select a 32-byte line in data array 605 and an address tag in tag array 610 simultaneously in each of the four ways (eight entries total). When a cache line is written into data array 605, the tag address A(31:14), which is a physical address, is simultaneously stored in one of the 512 locations in tag array 610, as determined by the address bits A(13:5). Thus, when address bits A(13:5) are applied to tag array 610, the stored value of tag address A(31:14) is sent to comparator 615 for comparison with address bits A(31:14) of the current physical address. At the same time, the 32 bytes in the data array 605 corresponding to A(13:5) are applied to one of the channels of multiplexer 620.

If the address bits A(31:14) are the same, a cache hit has occurred and one (and only one) of the enable signals, WAY 0 HIT, WAY 1 HIT, WAY 2 HIT, or WAY 3 HIT, will go high for the corresponding way. This will, in turn, select the correct channel of multiplexer 620 (which forms a part of sector selection circuitry) and output a corresponding one of the 32-byte lines of data, referred to generically as WAY 0 DATA, WAY 1 DATA, WAY 2 DATA, or WAY 3 DATA.

It is noted that two address bits, A13 and A12, must be translated in order to select the correct set in each way. Thus, a first delay is caused by the translation of A13 and A12. A second delay is incurred after translation while the correct set is being selected in tag array 610 (i.e., before the tag address A(31:14) settles at the output of tag array 610). When the tag address A(31:14) is finally valid at the output of tag array 610, another delay is incurred while the tag array 610 output is compared in comparator 615 to the current memory address A(31:14).

The present invention improves the rate at which data may be accessed in each of the ways of L1 cache 245 by dividing the L1 cache 245 (and Ways 0–3) into sectors corresponding to predetermined values of A13 and A12. The untranslated physical bits A(11:5), which are available early in AC1, are used to select a set in each sector of the L1 cache 245. The multiple selected sets from the same way are then multiplexed at the data output of the way. The translated physical address bits A13 and A12 control the output multiplexer in each way and thereby select the correct data set (i.e., cache line) to be output from the way. Thus, the speed of the way is more closely related to the rate at which A13 and A12 can be translated, and is not limited by the speed of the tag array 610 and comparator 615.

Figure 7:
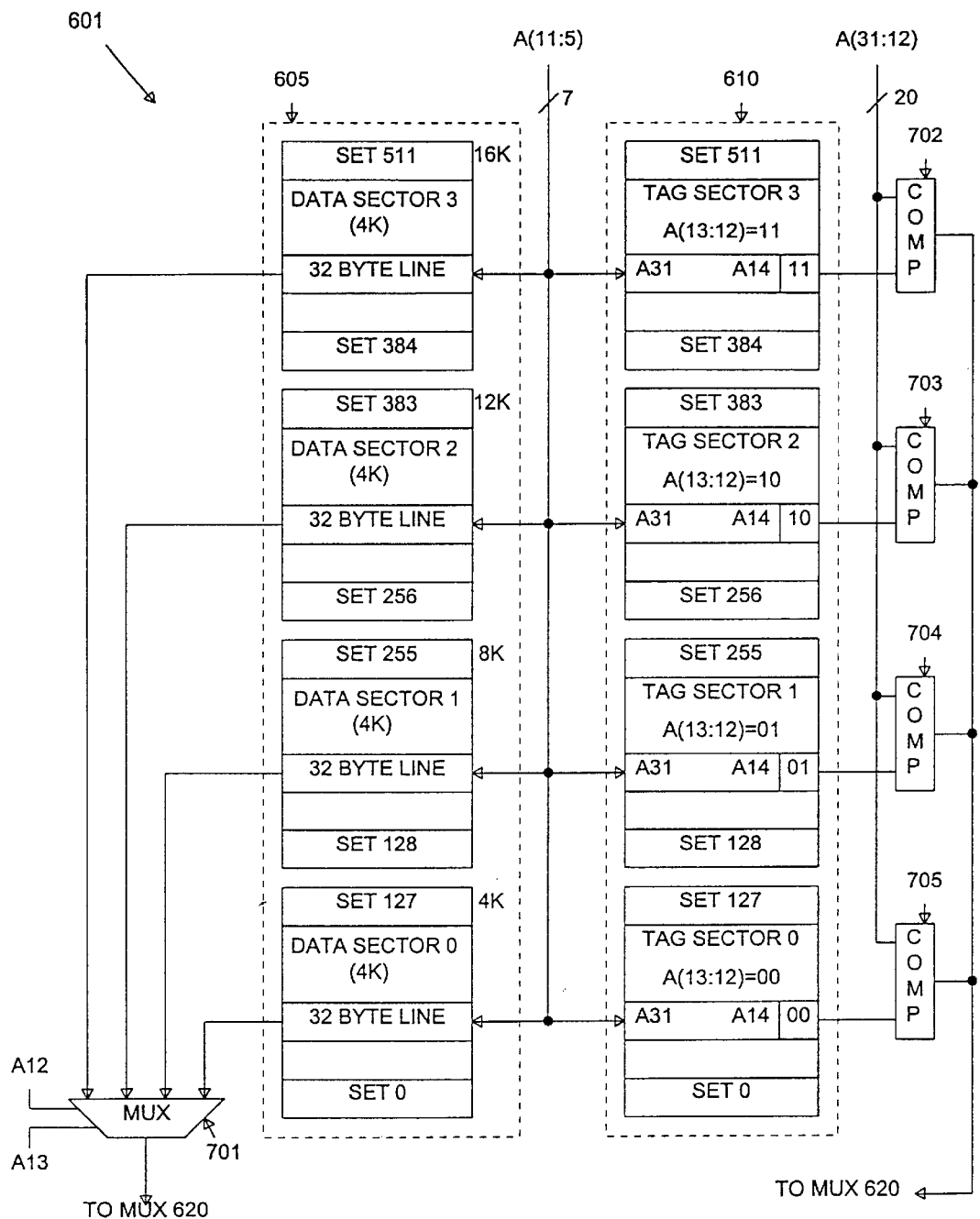
FIG. 7 depicts an improved L1 cache divided into sectors according to one embodiment of the present invention.

FIG. 7 depicts an improved L1 cache 245 divided into sectors according to one embodiment of the present invention. Once again, only Way 0 (block 601) needs to be shown, since Ways 1–3 are functionally equivalent to Way 0. Tag array 610 and data array 605 are subdivided into four sectors, 0–3, according to the values of A(13:12). When data is written to L1 cache 245, the cache line L1 stored in a selected one of Data Sectors 0–3 in data array 605 and the tag address A(31:12) is stored in a selected one of Tag Sectors 0–3 of tag array 610. For example, if bits A(13:12) of the translated physical address are 00, the tag address A(31:12) is written into Tag Sector 0 and the corresponding 32-byte cache line is written into Data Sector 0 of data array 605. Similarly, if bits A(13:12) of the translated physical address are 01, 10, or 11, cache lines are written into Data Sectors 1, 2 or 3, respectively, and tag addresses are written into Tag Sectors 1, 2 or 3, respectively.

During a read operation, the address bits A(11:5), which do not need to be translated and are available during AC1, are applied to each of the four sectors. Thus, a set is addressed in each of the four sectors. The four corresponding cache lines are output to multiplexer 701 (which forms a part of sector selection circuitry). At the same time, the tag address bits A(31:12) are output from the selected set in each tag sector to a respective first input channel on a respective one of comparators 702–705. The second input channel on each of comparators 702–705 is connected to the address bits A(31:12) of the translated physical address.

The address bits A(11:5) are the only bits required to access the caches lines in each of Data Sectors 0–3 and the tag address bits A(31:12) in each of Tag Sectors 0–3. Since address bits A(11:5) do not need translation, they are available during AC1. Therefore, the caches lines from Data Sectors 0–3 are available at the inputs of multiplexer 701 before address bits A13 and A12 are translated. Similarly, the tag address bits A(31:12) from Tag Sectors 0–3 are available at the inputs of comparators 702–705 before address bits A13 and A12 are translated.

The address bits A(11:5) can have values only between 0 and 127, thereby addressing any one of 128 possible sets per sector. Nonetheless, the sets in FIG. 7 are shown numbered sequentially from Set 0 to Set 511 across sector boundaries. This is done only for the purpose of illustration. The number of each set shown in FIG. 7 reflects the "offset" value of A13 and A12. For example, Set 0 and Set 384 are both enabled by the set address A(11:5)=0000000. However, Set 384 is only accessed (written to) when A(13:12)=11 and Set 0 is only accessed (written to) when A(13:12) =00.

When address bits A13 and A12 are translated during AC2, A13 and A12 immediately select the corresponding channel of multiplexer 701 and the corresponding cache line is output to multiplexer 620. At the same time, translated address bits A(31:12) are applied to comparators 702–705 and, if they match one of the four tag addresses output from the tag sectors, an output line of one of the comparators 702–705 will go high (i.e., a cache hit has occurred). Advantageously, since the A12 and A13 bits from each Tag Sector are always different, only one comparator will go high at time. This allow the outputs to be connected together to form a wired-OR gate. The wired-OR output of comparators 702–705 forms one of the selects, WAY 0 HIT—WAY 3 HIT, on multiplexer 620.

As the above description shows, cache lines are output from each way faster because translated address bits A13 and A12 are no longer needed to retrieve the cache line from the data array 605 or retrieve the tag address from the tag array 610. Instead, the translated bits A13 and A12 are used to select a channel in multiplexer 620. This is much faster than selecting a 32-byte cache line from data array 605, which is essentially a (comparatively slow) RAM device. Additionally, the tag addresses are output from the Tag Sectors 0–3 during AC1 and are available for comparison even before the translated physical address bits A(31:12) are sent to comparators 702–705. It is therefore not necessary to wait for the value of the selected tag address to settle and become valid at the tag array 610 output after translation of A13 and A12, because A13 and A12 are no longer required to select a tag address. Hence, the speed of the L1 cache 245 is now closer to the speed at which the address can be translated to a physical address.

In a preferred embodiment of the present invention, the values of A13 and A12 assigned to the sectors in the L1 cache 245 may be programmed under the control of the cache unit 204. For example, the physical locations of Sets 0–127 may be programmed to hold tag addresses ending with A(13:12)=00 (Tag Sector 0), A(13:12)=01 (Tag Sector 1), A(13:12)=10 (Tag Sector 2), or A(13:12)=11 (Tag Sector 3). This advantageously allows a processor with a defective cache sector to be salvaged, at the cost of a smaller cache size. For example, if faults are found in Set 50 in Data Sector 0 and in Set 200 in Data Sector 1, Data Sector 3 and Data Sector 4 may be redesignated as Data Sector 0 and Data Sector 1, respectively, according to the value of tag address bit A13. The dysfunctional circuitry used by the old Data Sectors 0 and 1 is no longer accessed and the L1 cache 245 becomes a 32 Kbyte 4-way set associative cache. If three sectors are found to be defective, the remaining good sector is still usable and may contain any value of A13 and A12. The L1 cache 245 then becomes a 16 Kbyte 4-way set associative cache.

This redesignation may occur in the factory before sale of the processor 200 in a computer. The processor 200 could then be sold with a less powerful (i.e., smaller) cache at a lower price. In a preferred embodiment, the redesignation of sectors may also occur when a cache error is detected during a self test routine, such as when a computer is booted up. The computer maps out the defective sectors in the cache and continues to run with the smaller cache. Ideally, a warning message is displayed on the monitor warning of the cache fault(s).

The redesignation of sectors in the L1 cache 245 may be accomplished by reprogramming switch positions in the data paths that write cache lines into data array 605 and tag address bits A(31:12) into tag array 610. For example, in an initial configuration, cache lines and tags are switched to Sector 3 when A(13:12)=11, to Sector 2 when A(13:12)=10, to Sector 1 when A(13:12)=01, and to Sector 0 when A(13:12)=00 during a cache write operation. If one or both of Sectors 3 and 4 becomes defective, the switching paths may be reconfigured such that cache lines and tags are switched to Sector 1 when A12=1 and to Sector 0 when A12=0 during a write operation. During a read operation, address line A13 is held at 0 on multiplexer 701 so that only Sectors 0 and 1 are selected, depending on the value of A12. The value of A13 in Tag Sectors 0 and 1 may have values of either 0 or 1, however.

In one embodiment of the present invention, the rate at which data may be accessed in each of the ways of the L1 cache 245 is further improved by providing a shadow L1 look-aside translation buffer (TLB). The shadow L1 TLB holds the same tag addresses as the primary L1 TLB 230, but provides translated physical addresses to the L1 cache 245 much more rapidly because it is an integral part of the cache. Before describing the shadow L1 TLB in detail, the operation of the L1 TLB 230 and the L2 TLB 235 will be discussed.

Figure 8:
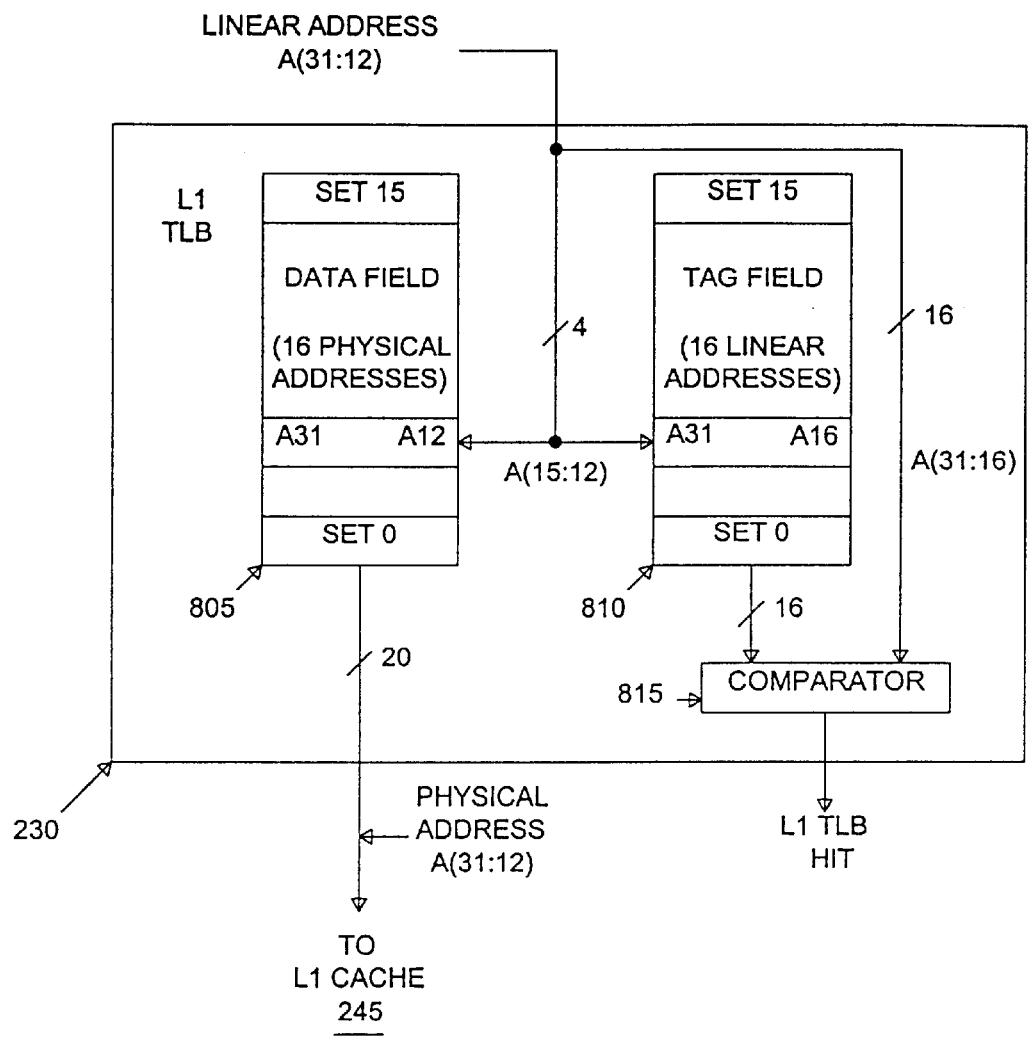
FIG. 8 depicts a conventional L1 TLB for translating linear addresses for the L1 cache or external memory.

FIG. 8 depicts a conventional L1 TLB 230 for translating linear addresses for the L1 cache 245. L1 TLB 230 is a 16-entry direct mapped buffer that receives linear address A(31:12) from the core 202 of the processor 200. Linear address A(31:12) identifies the current 4096 byte page in memory. Four linear address bits A(15:12) select one of the sixteen (16) page table entries in L1 TLB 230. Each page table entry comprises a linear address in the Tag field 810 array and a corresponding physical address in the Data field 805 array. Each page table entry also comprises a number of access bits, such as V (valid), U/S (user/supervisor), R/W (read/write), D (dirty), etc.

When A(15:12) selects an entry in the L1 TLB 230, Tag field 810 outputs the tag address bits A(31:16) stored in the entry to one of the input channels of comparator 815. The other input channel of comparator 815 receives linear address bits A(31:16) of the current memory address. If the bits are the same, a TLB "hit" has occurred (i.e., the memory page identified by linear address A(31:12) matches the linear address of a memory page previously stored in the Tag field 810). The signal L1 TLB HIT goes high, thereby signaling the L1 cache 245 that a valid physical address is being sent to the L1 cache 245.

At the same time that the linear address bits are being compared, linear address bits A(15:12) select the physical address bits A(31:12) in Data field 805 that correspond to the stored tag address in Tag field 810. Data field 805 outputs the selected physical address A(31:12) to L1 cache 245 so that the physical address may immediately be used by L1 cache 245 when L1 TLB HIT goes high.

If the tag address A(31:16) in Tag field 810 does not match the current linear address A(31:16), an L1 TLB "miss" has occurred and the physical address A(31:12) output by the L1 TLB 230 is ignored by L1 cache 245. After an L1 TLB miss, the L2 TLB 235 is examined to determine if the L2 TLB 235 contains the linear address A(31:12). If the L2 TLB 235 does contain the linear address A(31:12), then an L2 TLB "hit" has occurred, the entire entry in the L2 TLB 235 is transferred to the L1 TLB 230, thereby updating the L1 TLB 230 with the "missed" linear address, physical address and access bits. At the same time, the physical address A(31:12) retrieved from the L2 TLB 235 and an L2 TLB HIT signal are sent to the L1 cache 245, so that processing may continue.

If the L2 TLB 235 does not contain the linear address A(31:12), then an L2 TLB "miss" has occurred, the entire entry the L2 TLB 235 is transferred to the L1 TLB 230, thereby updating the L1 TLB 230 with the "missed" linear address, physical address and access bits. This means that the requested data must be retrieved from system memory 402. The linear address A(31:12) is translated by the MMU 206 and the data retrieved from system memory 402 is written back to the L1 cache 245, the L2 cache 404 the L1 TLB 230 and the L2 TLB 235, thereby updating the L1 TLB 230 and the L2 TLB 235 with the "missed" linear address, physical address and access bits.

Figure 9:
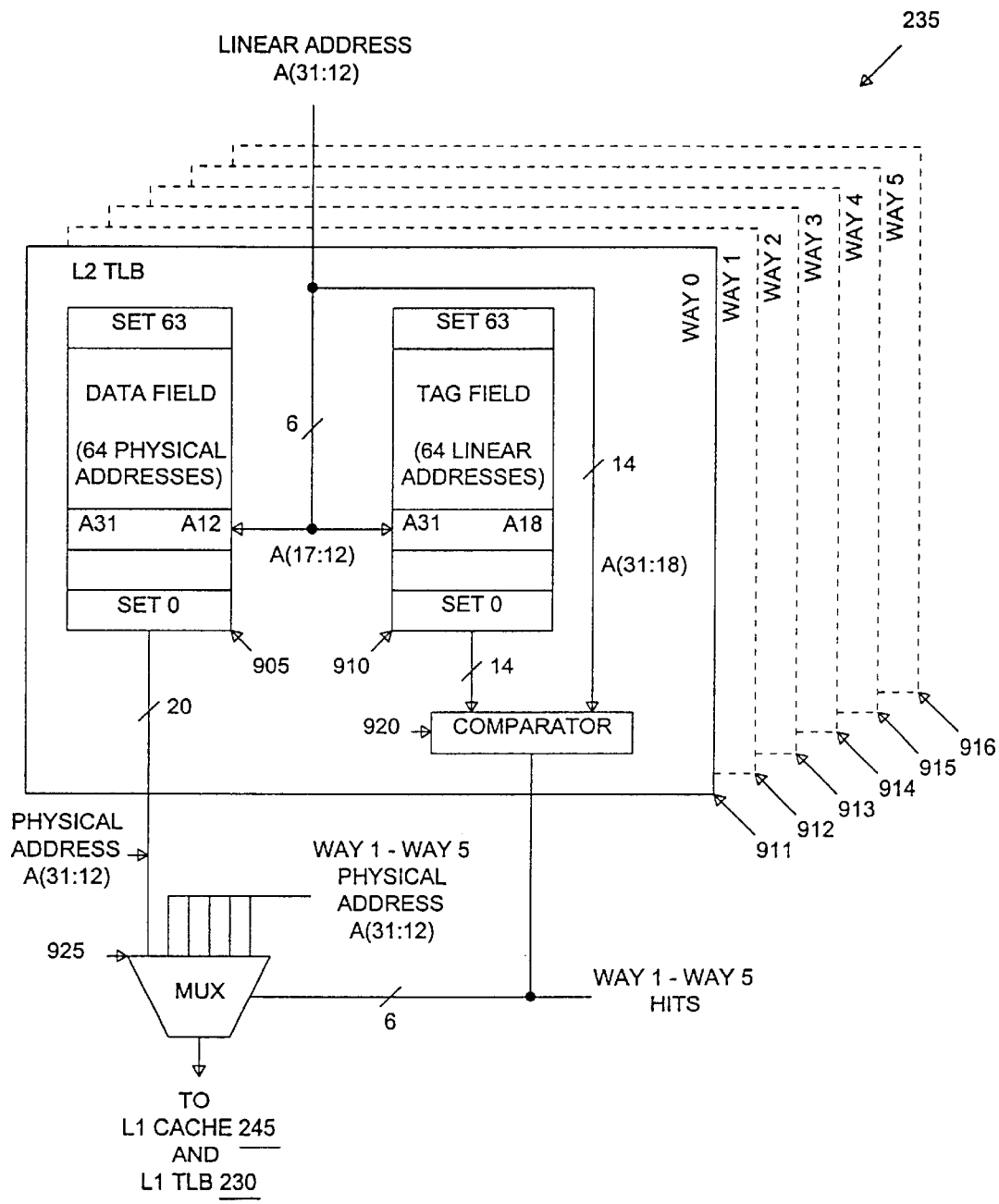
FIG. 9 depicts a conventional L2 TLB for translating linear addresses for the L1 cache or external memory.

FIG. 9 depicts conventional L2 TLB 235 for translating linear addresses for the external L2 cache 402. L2 TLB 235 is a 384-entry 6-way set associative buffer that receives linear address A(31:12) from the core 202 of the processor 200. The L2 TLB 235 is organized as 64 sets, Sets 0–63, that are divided into six ways, Ways 0–5. Blocks 911–916 in the L2 TLB 235 comprise Ways 0–5, respectively. Ways 1–5, shown in dotted outline, are functionally equivalent to Way 0. This being the case, only Way 0 need be discussed to further explain the operation of the L2 TLB 235.

Each set consists of twelve entries: a linear address tag in Tag field 910 and a corresponding physical address in Data field 905 for each of the six ways. The sets also contain access bits associated with the entries. The access bits may be ignored for this discussion, such as V (valid), U/S (user/supervisor), R/W (read/write), D (dirty), etc. Linear address bits A(17:12) are used to select the sets. For example, if address bits A(17:12) are 000000, Set 0 is being accessed and, in all four ways, a corresponding physical address A(31:12) in Data field 905 and a corresponding linear tag address A(31:18) tag in Tag field 910 are accessed.

When A(15:12) selects an entry in the Tag field 810, Tag field 810 outputs the tag address bits A(31:18) stored in the entry to one of the input channels of comparator 920. The other input channel of comparator 920 receives linear address bits A(31:18) of the current memory address. If the bits are the same, an L2 TLB "hit" has occurred (i.e., the memory page identified by linear address A(31:12) matches the linear address of a memory page previously stored in the Tag field 910). The comparator 920 output generates the signal, WAY 0 HIT, which indicates a "hit".

At the same time that the linear address bits are being compared, linear address bits A(17:12) select the physical address A(31:12) in Data field 905 that corresponds to the stored tag address in Tag field 910. Data field 905 outputs the selected physical address A(31:12) to one of the input channels of multiplexer 925. If a hit occurs in any of the six ways, one of the six enable signals, WAY 0 HIT—WAY 5 HIT, goes high for the corresponding way. This, in turn, selects the correct channel of multiplexer 925 and outputs a corresponding one of the physical addresses A(31:12). As noted above, if an L2 TLB "miss" occurs, the data must be retrieved from system memory 402.

It is apparent from the foregoing that the speed at which the L1 TLB 230 provides a translated physical address to the L1 cache 245 directly affects the access time of the L1 cache 245. Unfortunately, the data paths between the L1 TLB 230 and the L1 cache 245 are lengthy and drive a large number of gates, including intermediate multiplexers used to route the physical. address A(31:12) to other functional units in the processor 200. This means that the physical address A(31:12) bits are comparatively slow in reaching the L1 cache 245, causing a delay in accessing data in the L1 cache 245.

In one embodiment of the present invention, the time delay in transferring a physical address A(31:12) to, and then reading data from, the L1 cache 245 is reduced by providing a "shadow" translation look-aside buffer located proximate the L1 cache 245. The shadow TLB contains identical copies of the sixteen physical addresses in the L1 TLB 230, but does not contain, and does not require, either the linear tag addresses or the access bits in the L1 TLB 230. For the purpose of clarity in explaining below the operation of the shadow TLB, the L1 TLB 230 may from time to time be referred to as the "primary" L1 TLB.

Figure 10:
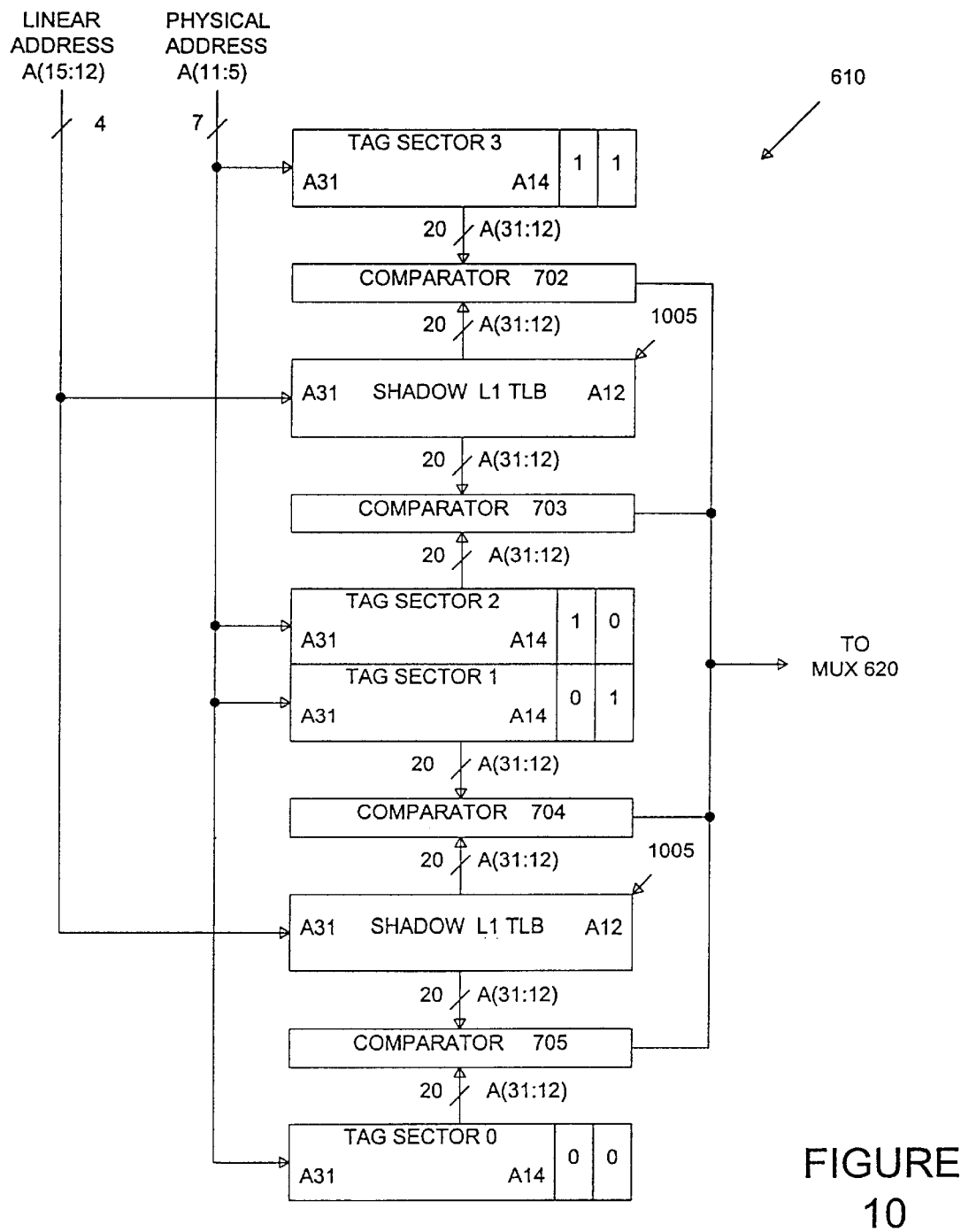
FIG. 10 depicts an improved tag array in the L1 cache, wherein a shadow L1 TLB is integrated into the sectors of the tag array, according to one embodiment of the present invention.

FIG. 10 depicts an improved tag array 610 in the L1 cache 245, wherein a shadow L1 TLB 1005 is integrated into the sectors of the tag array 610, according to one embodiment of the present invention. In the illustrated embodiment, the shadow L1 TLB 1005 is bifurcated in order to minimize the length of lead lines from different tag sectors in tag array 610. One portion of the shadow L1 TLB 1005 and comparators 702 and 703 are disposed proximate (and perhaps between) the physical address A(31:12) outputs of Tag Sector 3 and Tag Sector 2. The other portion of the shadow L1 TLB 1005 and comparators 704 and 705 are disposed proximate (and perhaps between) the physical address A(31:12) outputs of Tag Sector 1 and Tag Sector 0.

The address translation operation of shadow L1 TLB 1005 is simpler than the address translation operation of the primary L1 TLB 230. Linear address bits A(15:12) are received into the shadow L1 TLB 1005 (and therefore into the L1 cache 245) and select one of sixteen entries in the data field of the shadow L1 TLB 1005. The physical address A(31:12) in the selected entry is immediately output to the four comparators 702–705. The shadow L1 TLB 1005 does not contain a tag field and tag address comparators similar to those in the primary L1 TLB 230.

If the physical address A(31:12) selected by A(15:12) is wrong, then it is also wrong in the primary L1 TLB 230, since both L1 TLB's contain identical physical addresses A(31:12). If physical address A(31:12) is wrong in the "primary" L1 TLB 230, then a "miss" has occurred in both the L1 TLB 230 and the L1 cache 245. The physical address A(31:12) is ignored after an L1 cache 245 miss. Therefore, no harm is done in not performing a tag address comparison in the shadow L1 TLB 1005.

The L1 cache 245 no longer needs to wait to receive the translated physical address A(31:12) from the primary L1 TLB 230. As FIG. 10 shows, the L1 cache 245 now requires only sixteen address bits: physical address A(11:5), which does not require translation and is available early in AC1, and linear address bits A(15:12), which are also available early in AC1. The shadow L1 TLB 1005 output the physical address bits A(31:12) much more. rapidly than they can be translated in, and transferred from, the primary L1 TLB 230. When the physical address bits A(31:12) are output by the shadow L1 TLB 1005, the tag array 610 in L1 cache 245 compares the physical address bits A(31:12) to the tag address A(31:12) as described above in connection with FIGS. 6 and 7. The untranslated address A(11:5) selects tag addresses in all four tags sectors of the tag array 610 and the four selected tag addresses A(31:12) are compared by comparators 702–705 to the output of the shadow L1 TLB 1005. The output of the four comparators are connected to each other to form a wired-OR gate. The wired-OR outputs from the comparators in all four ways of the L1 cache 245 are used as multiplexer channel selects for multiplexer 620.

The data array 605 and the multiplexer 701 in FIG. 7 are not show in FIG. 10 because they are not affected by the shadow L1 TLB 1005. However, the earlier availability of translated physical address A(31:12) from the shadow L1 TLB 1005 means that the comparators 702–705 more quickly generate a "hit" signal for each of Ways 0–3 (i.e., WAY 0 HIT—WAY 3 HIT). Also, the earlier availability of translated physical address bits A13 and A12 means that a cache line from data array 605 in each way is more quickly selected by multiplexer 701 (i.e., WAY 0 DATA—WAY 3 DATA). This means that both the channel data and the channel select signals for multiplexer 620 are available to output data from the L1 cache 245 onto the data bus.

The operation of the shadow L1 TLB 1005 has been explained in connection with an L1 cache 245 that is partitioned into sectors. However, those skilled in the art will recognize that the shadow L1 TLB 1005 described above may readily be implemented in a non-partitioned L1 cache and still provide faster translation of the higher order address bits A(31:12) than a conventional "primary" L1 translation look-aside buffer.

It is also apparent from the foregoing that the speed at which the linear address bits A12 and A13 are translated into physical address bits A12 and A13 by the L1 TLB 230 directly affects the access time of the L1 cache 245. It is recalled that translated physical address bits A12 and A13 are used to control multiplexer 701, which selects one 32-byte cache line from one of the four sectors in each of the four ways in the L1 cache 245. The sooner that translated address bits A12 and A13 are available at multiplexer 701, the sooner that the selected cache line may be output from the way to multiplexer 620. Translated physical address bits A12 and A13 normally become available from the outputs of the data field 805 in the L1 TLB 230 during AC2, along with translated physical address bits A(31:14).

Unfortunately, the speed at which the L1 TLB 230 can translate address bits A12 and A13 is comparatively slow. The L1 TLB 230 is essentially a RAM device that contains 16 entries (Sets 0–15). The entries are subdivided into the data field 805, the tag field 810 and numerous access bits, so that each entry contains over 40 bits. The L1 TLB 230 therefore requires comparatively long word lines and somewhat complex row/column selection circuitry. The RAM cells in the L1 TLB 230 are also synchronous and a selected data location must await the next clock edge before being output from the data field 805. In sum, the speed at which physical address bits A12 and A13 (as well as A(31:14)) are made available at the output of the L1 TLB 230 is slowed by the size of the RAM structure in the L1 TLB 230.

The present invention further improves the operation of the L1 cache 245 by providing an L1 TLB slice that is used to store a separate copy of the physical address bits A12 and A13. The L1 TLB slice is essentially an asynchronous RAM that is much smaller, and consequently much faster, than the primary L1 TLB 230. Like the primary L1 TLB 230, the L1 TLB slice receives the untranslated. linear address bits A(15:12) during AC1 and uses the linear address bits A(15:12) to select (or index into) one of sixteen entries in the L1 TLB slice. The entries contain only A13 and A12. Thus, the translated physical address bits A12 and A13 are available during AC1, rather than during AC2, and the selection signals for multiplexer 701 are also available that much sooner.

Figure 11:
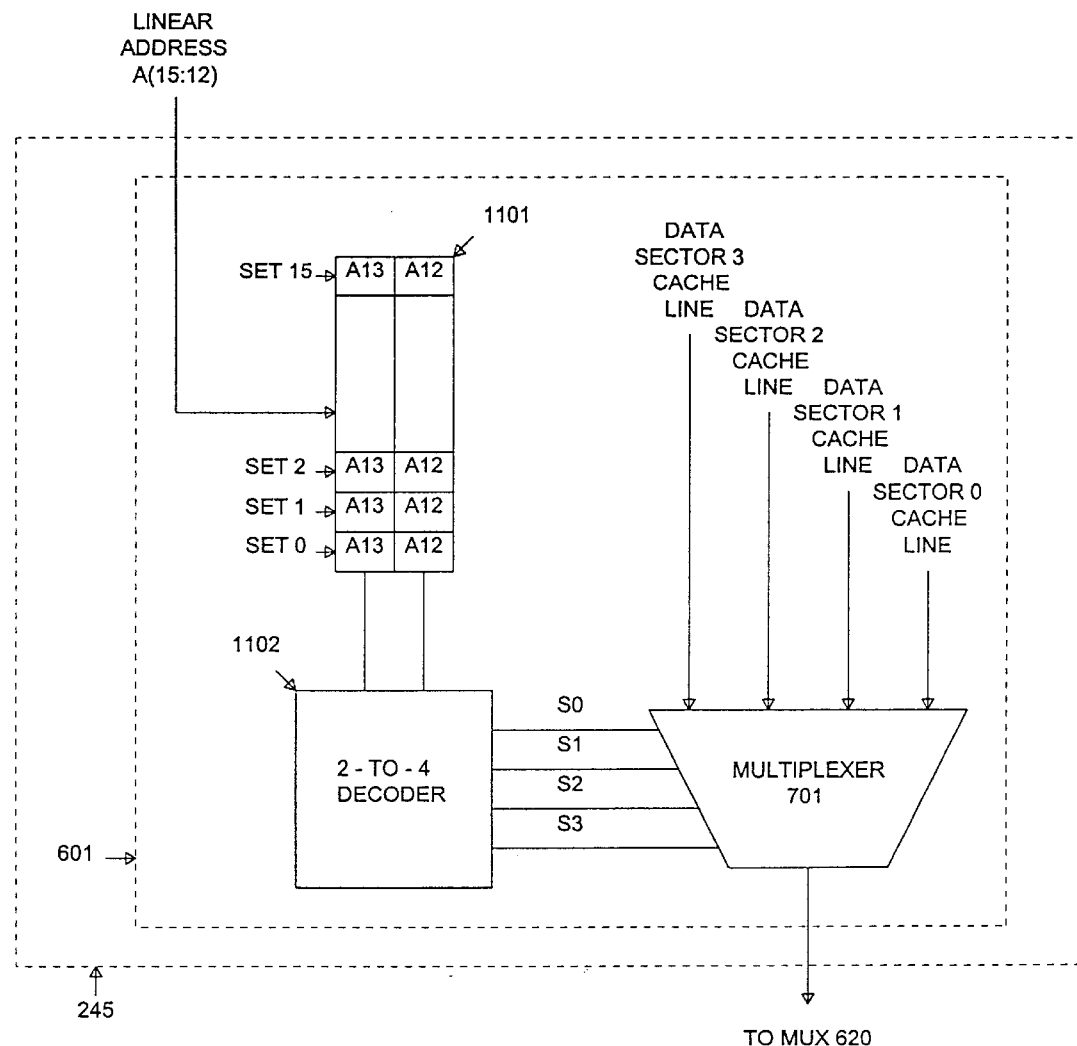
FIG. 11 illustrates an L1 TLB slice according to one embodiment of the present invention.

FIG. 11 depicts an L1 TLB slice 1101 according to a first embodiment of the present invention. The L1 TLB slice 1101 is shown disposed in Way 0 (reference numeral 601), shown in dotted outline, of the L1 cache 245, also shown in dotted outline. In the first embodiment (and some other embodiments) of the present invention, a single L1 TLB slice may be implemented that provides translated address bits A12 and A13 for all of the ways in the L1 cache 245. In other embodiments, a separate L1 TLB slice may be implemented in each way.

When a physical address is written into the L1 TLB 230 after an L1 TLB "miss," the A12 and A13 bits are simultaneously written to the L1 TLB slice 1101, so that the L1 TLB 230 and the L1 TLB slice 1101 contain identical A12 and A13 bits. In L1 TLB implementations where the translated A12 and A13 bits are provided to other functional units in the processor 200 at the same time as the translated A(31:14) bits, redundant copies of physical address bits A12 and A13 may continue to be stored in the entries in data, field 605 of the primary L1 TLB 230. In other L1 TLB implementations where the translated A12 and A13 bits need not be provided to other functional units in the processor 200 at the same time as the translated A(31:14) bits, physical address bits A12 and A13 may be eliminated from the entries in data field 605 of the primary L1 TLB 230. This advantageously reduces the size, and increases the speed, of the primary L1 TLB 230.

When the untranslated linear address bits A(15:12) select an entry in the L1 TLB slice 1101, physical address bits A13 and A12 are output from the L1 TLB slice 1101 to a 2-to-4 decoder 1102. The outputs of the decoder 1102 are the multiplexer selection lines, S0–S3. In some embodiments, decoder 1102 may be an integral part of the multiplexer 701. Thus, a 32-byte cache line is selected from one of the four sectors, Data Sectors 0–3, in Way 0 of the L1 cache 245 and is output during AC1 to the multiplexer 620. Each of Ways 1–3 also outputs a 32-byte cache line to the multiplexer 620.

It is noted that the values (00–11) of the two bits A12 and A13 entirely determine the values of the multiplexer selection bits S0–S3. This allows yet another improvement to be made to the operation of the L1 cache 245. A preferred embodiment of the present invention provides an L1 TLB slice that stores the values of the selection bits S0–S3 corresponding to the values of the physical address bits A12 and A13, rather than storing the actual physical address bits A12 and A13. Although this slightly increase the size and complexity of the L1 TLB slice, these increases are more than offset by the speed increase gained by omitting the decoder 1102.

Figure 12:
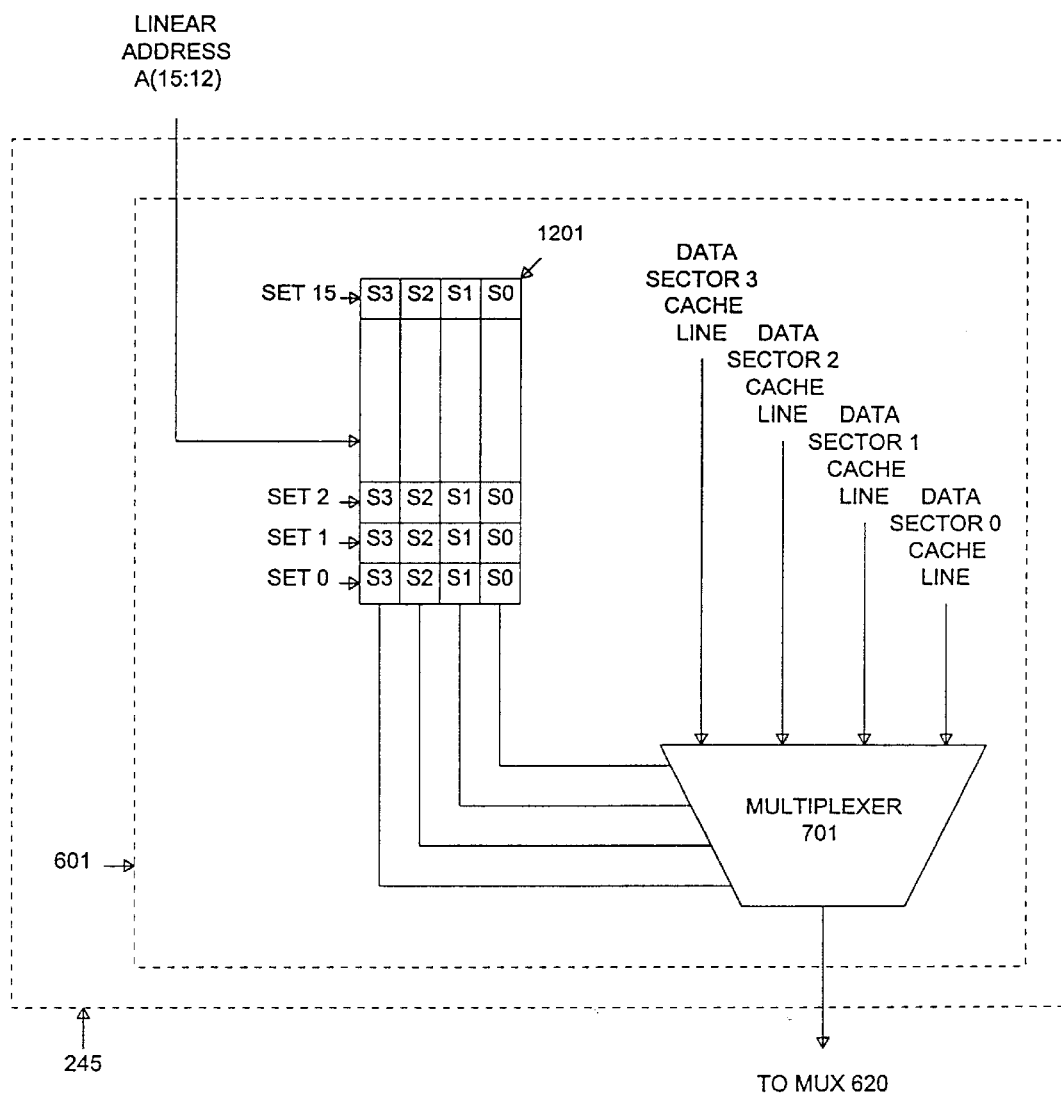
FIG. 12 illustrates an L1 TLB slice according to another embodiment of the present invention.

FIG. 12 depicts an L1 TLB slice 1201 according to a second (and preferred) embodiment of the present invention. Once again, the L1 TLB slice 1201 is shown disposed in Way 0 (reference numeral 601), shown in dotted outline, of the L1 cache 245, also shown in dotted outline. As before, a single L1 TLB slice may be implemented that provides translated address bits A12 and A13 for all of the ways in the L1 cache 245, or a separate L1 TLB slice may be implemented in each way.

When a physical address is written into the L1 TLB 230 after an L1 TLB "miss", the A12 and A13 bits are not written to the L1 TLB slice 1201. Instead, A12 and A13 are decoded in a 2-to-4 decoder (similar to decoder 1102) and the output of the decoder, multiplexer selection bits S0–S3 are simultaneously written to the L1 TLB slice 1201. The L1 TLB slice 1201 now contains four bits in each of its sixteen entries, rather than two bits.

When the untranslated linear address bits A(15:12) select an entry in the L1 TLB slice 1201, selection bits S0–S3 are output from the L1 TLB slice 1201 to multiplexer 701. Thus, a 32-byte cache line is selected from one of the four sectors, Data Sectors 0–3, in Way 0 of the L1 cache 245 and is output during AC1 to the multiplexer 620. As before, each of Ways 1–3 also outputs a 32-byte cache line to multiplexer 620.

Microprocessors conforming to the x86 microprocessor architecture operate in different memory addressing modes, such as real mode and virtual 8086 mode, which include paging-enabled mode. These addressing schemes are well-known and readily understood. In real mode, the processor only addresses the lowest 1 Mbyte of memory. The real mode physical address is formed by multiplying by sixteen (16) the 16-bit segment base address located in the selected segment register and then adding the 16-bit offset address. This 20-bit address is then extended by filling the upper 12 bits with zeroes to form the 32-bit physical address.

In paging-enabled mode (hereafter, simply "paging mode"), a two-level page table addressing technique is implemented in a paging unit in the memory management unit 206. Memory is logically divided into 4 Kbyte pages. The 32-bit linear address used in memory is comprised of a directory table entry (bits A31 through A22), a page table entry (bits A21 through A12), and a page offset (bits A11 through A0). The directory table entry (DTE) is an index pointing to one entry in a directory table. The directory table is itself a 4 Kbyte page containing 1024 four-byte entries. Each four-byte entry in the directory table contains some attribute bits and a twenty-bit address that defines the starting (or base) address of a desired page table. The 1024 entries of the directory table can, therefore, identify the base addresses of 1024 page tables. The attribute bits in each DTE include a present (P) bit that indicates whether the desired page table is present in physical memory (i.e., RAM).

The page table entry (PTE) is an index pointing to a particular 4 Kbyte page within the desired page table established by the DTE. A page table is also a 4 Kbyte page containing 1024 four-byte entries. Each four-byte entry in the page table contains some attribute bits and a twenty-bit address that defines the starting (or base) address of a desired page. Taken together, the 1024 entries in the page table and the 1024 entries in the directory table can, therefore, identify in virtual memory the base addresses of 1,048,576 pages, each containing 4 Kbytes. Finally, the 12-bit page offset addresses a particular byte within the four Kbyte page. The attribute bits in each PTE also include a present (P) bit that indicates whether the desired page is present in physical memory.

The two-level addressing technique described above is sometimes referred to as "table walking." Table walking is time intensive because three memory cycles are required whenever a desired page is not found in physical memory. One memory cycle fetches the DTE from memory. Another memory cycle fetches the PTE from memory. Finally, a third memory cycle reads from, or writes to, the requested physical address.

This latency is avoided by use of the L1 TLB 230, the shadow TLB 1005, and the L2 TLB 235, which quickly provide the translated physical address. The DTE and the PTE comprise the upper twenty bits, A(31:12), of the linear addresses. Some of these address bits (e.g., A(15:12) or A(17:12)) are used to index into the tag arrays of the L1 TLB 230, the shadow L1 TLB 1005, and the L2 TLB 235. The remaining bits (e.g., A(31:16) or A(31:18)) are stored in the tag arrays.

More complete descriptions of real mode and paging mode addressing techniques are presented in "The Cyrix 6x86 MX Microprocessor Data Book," Order No. 94329-00, May 1997, incorporated by reference above, and in U.S. Pat. No. 5,913,923, issued on Jun. 22, 1999, entitled "MULTIPLE BUS MASTER COMPUTER SYSTEM EMPLOYING A SHARED ADDRESS TRANSLATION UNIT," which is hereby incorporated by reference.

The foregoing descriptions of the operations of the L1 cache 245, the L1 TLB 230, the shadow L1 TLB 1005, and the L2 TLB 235 did not discuss real mode operations, since real mode addresses do not require linear-to-physical address translations. Hence, the illustrations of the L1 cache 245, the L1 TLB 230, the shadow L1 TLB 1005, and the L2 TLB 235 in FIGS. 6 through 10 omitted certain circuitry related to real mode operations in processor 200.

In order to more thoroughly understand the operation and advantages of the real mode TLB of the present invention, the inter-operation and interconnection of conventional L1 TLB 230 and conventional L1 cache 245 will now be discussed in greater detail with regard to supporting both real mode and paging mode addressing techniques. Those skilled in the art will easily recognize that the following descriptions also apply to the L2 TLB 235. However, for the purpose of simplifying the following discussion, additional and redundant descriptions of the L2 TLB 235 are omitted.

Figure 13:
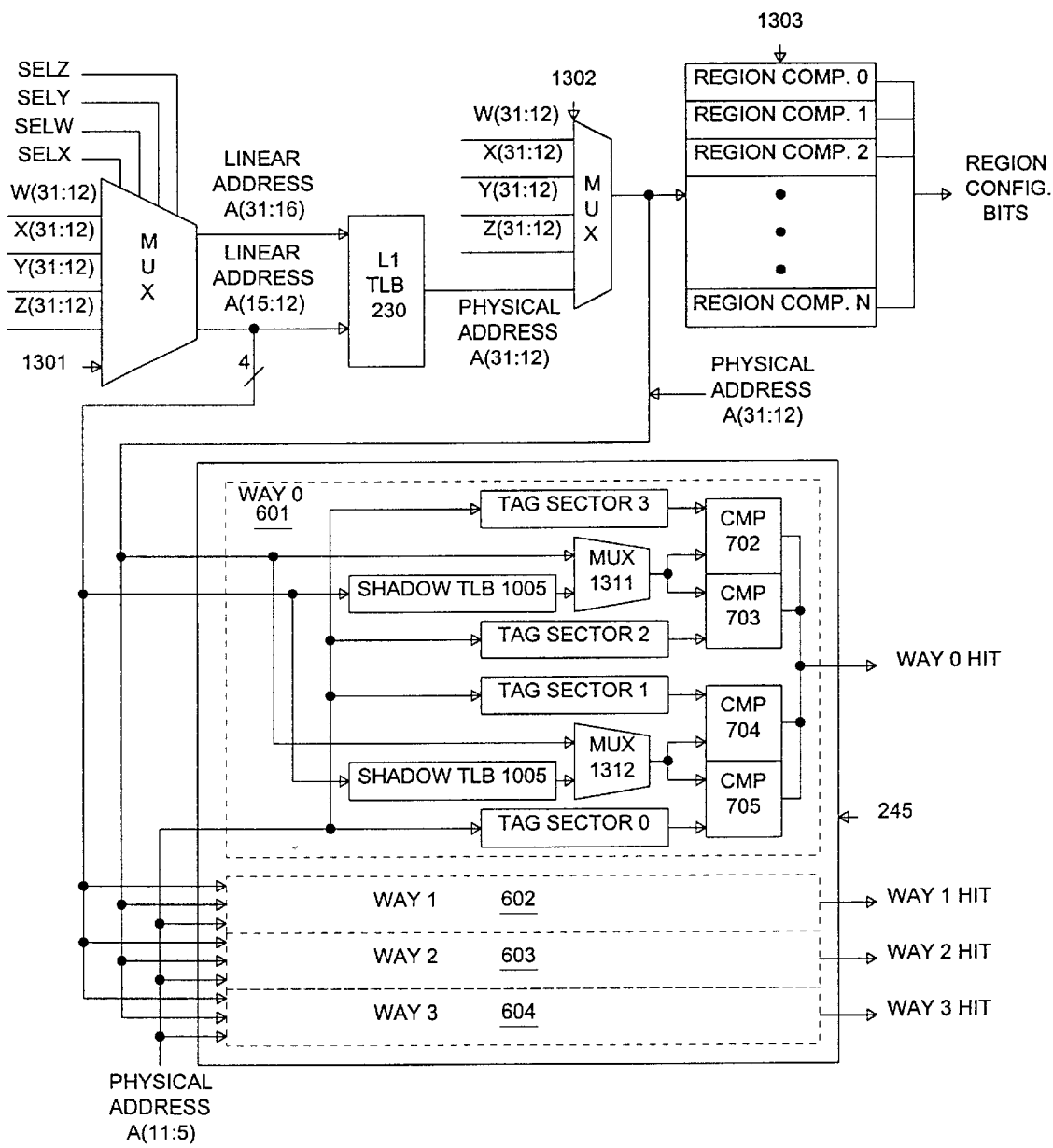
FIG. 13 illustrates a more detailed depiction of the interconnection of the L1 TLB and the L1 cache in accordance with the prior art.

FIG. 13 illustrates a more detailed depiction of the interconnection of the L1 TLB 230 and the L1 cache 245 in accordance with the prior art. The L1 cache 245 is implemented as a sectored cache containing a bifurcated shadow TLB 1005, as previously described and depicted in FIG. 10. Within the L1 cache 245, there are four ways, way 601 through way 604. Each way contains a sectored tag array, comprising Tag Sectors 0–3. Each way also contains a shadow TLB 1005, comparators 702–705, and multiplexers 1311 and 1312. Only a representative one of the ways, way 601, is shown in detail. The other ways are functionally identical to way 601 and need not be illustrated.

The four ways 601–604 in the L1 cache 245, hereafter referred to as "Way 0," "Way 1," "Way 2" and "Way 3," produce the output signals, WAY 0 HIT, WAY 1 HIT, WAY 2 HIT, and WAY 3 HIT, respectively. The tag sectors in each way are indexed by the physical address bits A(11:5) and the sixteen entries in each shadow TLB 1005 in each way are indexed by the linear address bits A(15:12).

The L1 cache 245 is able to store cache lines corresponding to both real mode addresses and paging mode addresses. The L1 TLB 230 and the L1 cache 245 receive real mode addresses and paging mode addresses from a plurality of sources in the processor 200. In the exemplary cache architecture depicted in FIG. 13, real mode and paging mode addresses are received from four address-generating sources, arbitrarily labeled W, X, Y, and Z. Linear addresses from the four address-generating sources are received in multiplexer 1301. Multiplexer 1301 has four input channels receiving the linear addresses W(31:12), X(31:12), Y(31:12), and Z(31:12). The address generating sources also provide multiplexer select signals, SELW, SELX, SELY, and SELZ, to multiplexer 1301, such that one and only one MUX channel is selected, thereby producing the linear address A(31:12) that is sent to L1 TLB 230. The linear address A(31:12) is shown split into linear address A(31:16) and linear address A(15:12) in order to delineate the data paths of the four least significant bits, A(15:12), of the linear address, which are used to index into the data and tag arrays of the L1 TLB 230 and the data arrays of the shadow L1 TLB 1005.

The L1 TLB 230 outputs a translated physical address A(31:12), that is applied to one input channel of multiplexer 1302. The other input channels of multiplexer 1302 receive physical addresses W(31:12), X(31:12), Y(31:12), and Z(31:12) from the four address-generating sources. Thus, when processor 200 is operating in real mode, one of the address-generating sources is selected by multiplexer 1302, which outputs the physical address A(31:12) that is used by the L1 cache 245. When processor 200 is operating in paging mode, multiplexer 1301, L1 TLB 230 and multiplexer 1302 provide both a linear address A(15:12) and a physical address A(31:12) that are used by the L1 cache 245.

The physical address A(31:12) output from multiplexer 1302 is also used by a plurality of region comparators 1303 that output region configuration bits that are stored in up to eight region control registers (RCR 0–RCR 7), previously illustrated and described in FIG. 4. The region control registers are used to specify attributes associated with different address regions in the memory space of system memory 402. The attribute bits in the region control registers can be used to activate and deactivate policies such as cacheability, weak locking, write gathering and cache write through. Thus, each physical address A(31:12) is compared to address boundary values stored in each of eight address region registers (ARR–ARR 7) by the region comparators (RCR 0–RCR 7) to produce corresponding region configuration bits. The region configuration bits are then used by control logic in the cache interface to validate or invalidate cache operations. The region registers are programmable so that the region comparators compare the physical address A(31:12) to variable address boundary values in the memory space of system memory 402.

Within each way of the L1 cache 245, multiplexers 1311 and 1312 select one of two channels corresponding to either the physical address A(31:12) output from multiplexer 1302 or the physical address A(31:12) output from the shadow TLB 1005 in thLe corresponding way. The output from multiplexer 1302 is selected in real mode. The output from the shadow TLB 1005 is selected in paging mode, so that the physical address A(31:12) is determined by the linear address A(15:12) received from multiplexer 1301. Thus, one input channel of the comparators 702–705 in each way receive physical addresses A(31:12) from multiplexers 1311 or 1312, and the other input channel receives physical addresses A(31:12) from the Tag Sectors 0–3 being indexed by physical address A(11:5).

The multiplexing stages described above are necessary in order to support both real mode and paging mode in processor 200. However, multiplexers 1302, 1311 and 1312 increase the complexity of the caching circuitry. They are also comparatively slow and consume a considerable amount of power due to their large size (i.e., 20-bits wide per channel), thereby reducing the performance of processor 200.

To overcome these difficulties, the present invention presents an improved address translation device that is simpler and faster than the above-described devices. In an exemplary embodiment of the present invention, an improved translation look-aside buffer is disclosed that contains both paging mode addresses and real mode addresses. All addresses are sent through the improved translation look-aside buffer, regardless of the addressing mode under which the processor 200 is operating. This allows for the elimination of the complex switching/multiplexing circuitry associated with the prior art address translation devices. The invention provides conventional linear-to-physical address translations for paging mode addresses and also provides an identity translation for real mode addresses.

In the discussion that follows, the present invention is described and illustrated in an exemplary improved L1 tag 1410 and in an exemplary improved shadow TLB 1421. This representative embodiment was chosen only for the purposes of simplifying and clarifying the explanation of the principles of the present invention. It will be apparent to those skilled in the art that principles of the present invention may readily be modified and adopted for use in, for example, an improved L2 TLB 235 or other address translation devices.

Figure 14:
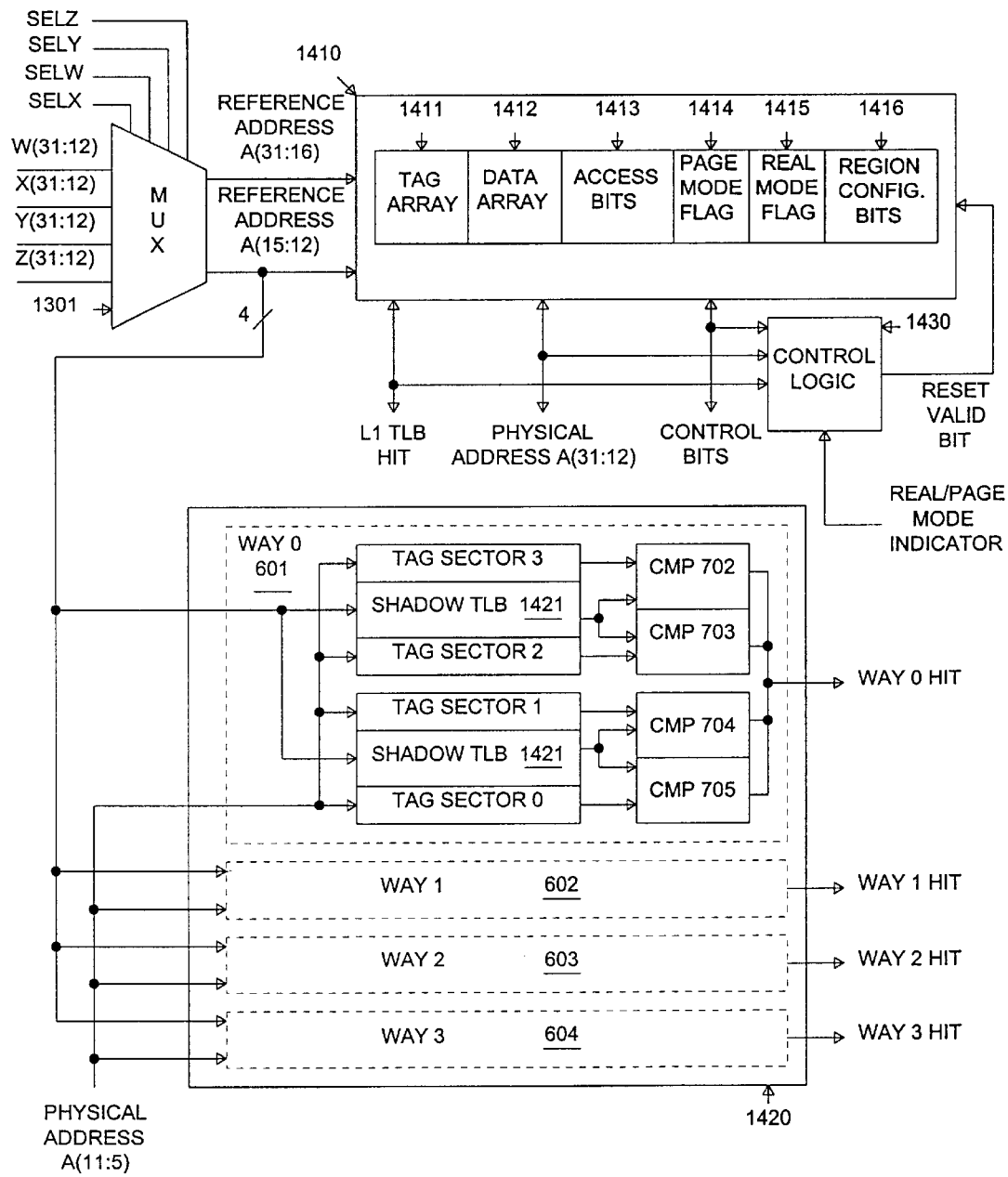
FIG. 14 illustrates an improved L1 TLB in accordance with an exemplary embodiment of the present invention.

FIG. 14 illustrates an improved L1 TLB 1410 in accordance with an exemplary embodiment of the present invention. The L1 TLB 1410 is a real mode translation look-aside buffer that contains linear addresses and physical addresses associated with a paging mode of operation and identity-mapped physical addresses associated with a real mode of operation. Multiplexer 1301 receives linear/physical addresses from a plurality of address-generating sources, arbitrarily labeled W, X, Y and Z. Multiplexer 1301 also receives channel selection signals, SELW, SELX, SELY, and SELZ from the address-generating sources, such that one and only one of the linear/physical addresses W(31:12), X(31:12), Y(31:12) and Z(31:12) may be selected at any one time.

The output of multiplexer 1301 is the "reference" address A(31:12) used to index into the tag array 1411, data array 1412, access bits 1413, page mode flag 1414, real mode flag 1415, and region configuration bits 1416 in the improved L1 TLB 1410. The reference address A(31:12) is shown split into reference address A(31:16) and reference address A(15:12) in order to delineate the data paths of the four least significant bits, A(15:12), of the reference address, which are used to index into the data and tag arrays of the L1 TLB 1410 and the data arrays of the shadow L1 TLB 1421. In the exemplary embodiment, L1 TLB 1410 is similar to L1 TLB 230 in that L1 TLB 1410 contains a sixteen entry tag array 1411, a sixteen entry data array 1412 and sixteen access bit entries containing access bits 1430 associated with the cache line addressed by each physical address A(31:12) stored in data array 1412.

However, multiplexer 1301 is also used to receive real addresses during a real mode operation of processor 200. Therefore, the input channels of multiplexer 1301 may comprise address bits (31:12) of either a linear address in a paging mode or a physical address in a real mode of operation. When processor 200 is operating in real mode, the physical address A(31:12) stored in data array 1412 after a cache miss is the same as the reference address A(31:12) used to address the L1 TLB 1410 when the miss occurred. Thus, the "translation" of the real mode address is actually an identity function.

The reference address A(15:12) that indexes into the improved TLB 1410 is also used to index into the improved bifurcated shadow TLB 1421 in each of the four ways of the improved L1 cache 1420. The four ways 601–604 in the L1 cache 1420, hereafter referred to as "Way 0," "Way 1," "Way 2" and "Way 3," produce the output signals, WAY 0 HIT, WAY 1 HIT, WAY 2 HIT, and WAY 3 HIT, respectively. The data entries in Tag Sectors 0–3 are indexed into by the untranslated physical address bits A(11:5) that are received during the AC1 cycle of the processor 200. The reference address bits A(15:12) index into the shadow TLB 1421 in each of the four ways in L1 cache 1420. The comparators 702–705 in each of Way 0 through Way 3 receive physical addresses from Tag Sectors 0–3 of each way and physical addresses from the shadow TLB 1421 in each way. The shadow TLB 1421 in each way of the L1 cache 1420 contains identical copies of the physical addresses A(31:12) contained in data array 1412 of the L1 TLB 1410.

The multiplexers 1311 and 1312 in each of the four ways that were used to select between the output of the prior art shadow TLB 1005 and the output of multiplexer 1302 in FIG. 13 are now eliminated. Additionally, the multiplexer 1302 used to select between the physical address A(31:12) output from the prior art L1 TLB 230 in paging mode and one of the four addresses W(31:12) through Z(31:12) in real mode is also eliminated.

The control logic 1430 receives the L1 TLB HIT signal and the CONTROL BITS signal from the L1 TLB 1410. The CONTROL BITS signal collectively represents the region configuration bits 1416, access bits 1413, the real mode flag 1415 and the page mode flag 1414. When a physical address is written into the L1 TLB 1410 after a cache miss has occurred, the control logic 1430 loads into the L1 TLB 1410 the region configuration bits 1416 corresponding to the missed physical address. The control logic 1430 also sets/ resets the page mode flag 1414 and the real mode flag 1415 according to whether the physical address causing the cache miss occurred in real mode or paging mode. The page mode and real mode flags may be represented by separate bits or may be represented by complementary values of a single bit. The control logic 1430 also receives an external real/page mode indicator signal which indicates the current operating mode (real or page) of the processor 200.

The L1 TLB "HIT" determination includes a comparison of the pending reference address A(31:16) and the stored tag address A(31:16). The L1 TLB "HIT" determination also includes a comparison of the stored page mode flag 1414 and/or the stored real mode flag 1415 with the REAL/PAGE MODE INDICATOR signal of the processor 200. If the mode flag(s) and the linear address tag in tag array 1411 all match the corresponding values for the pending reference address, then an L1 TLB "HIT" has occurred.

Figure 15:
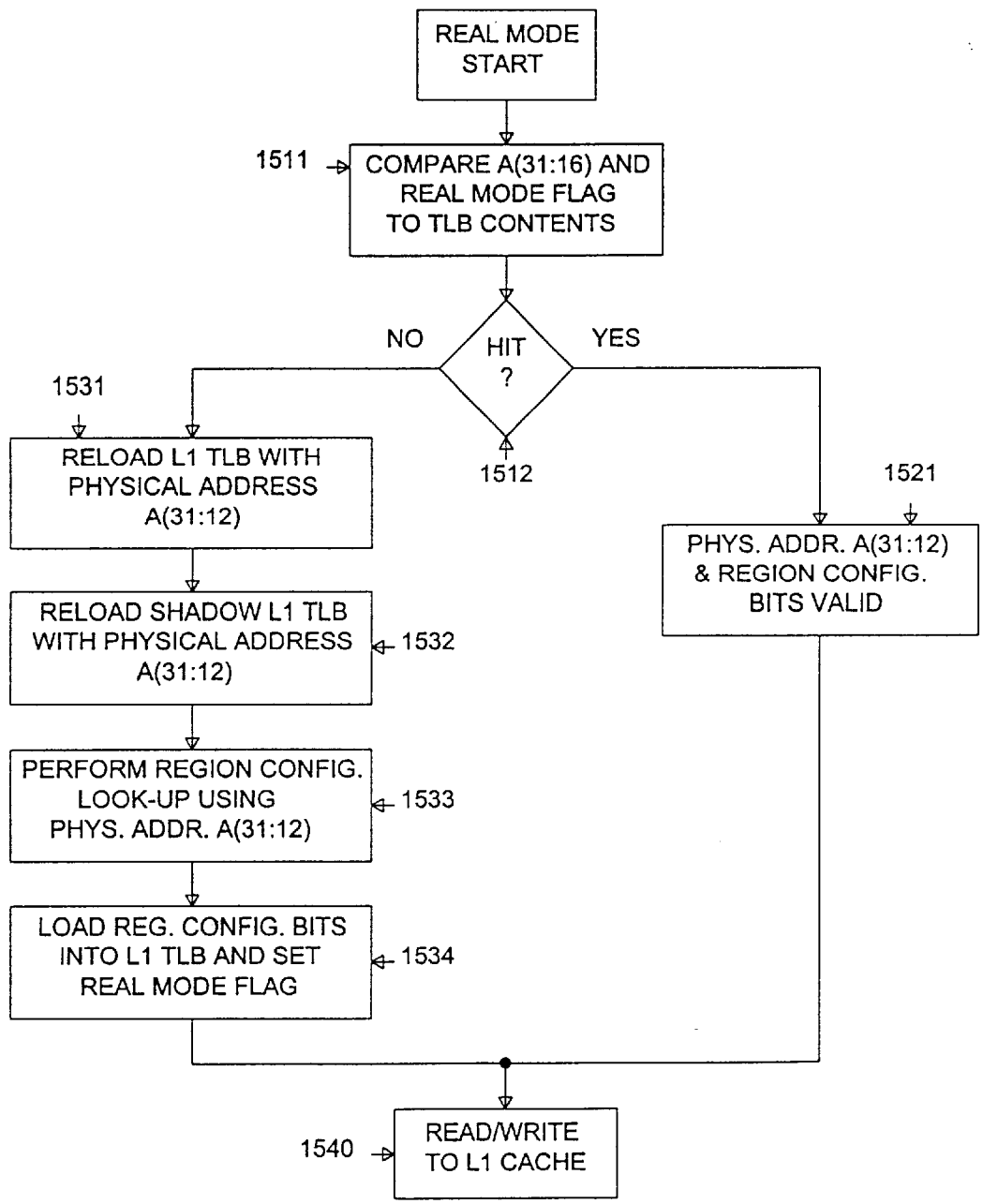
FIG. 15 is a flow diagram illustrating a real mode addressing operation of an exemplary real mode L1 TLB according to one embodiment of the present invention.
Figure 16:
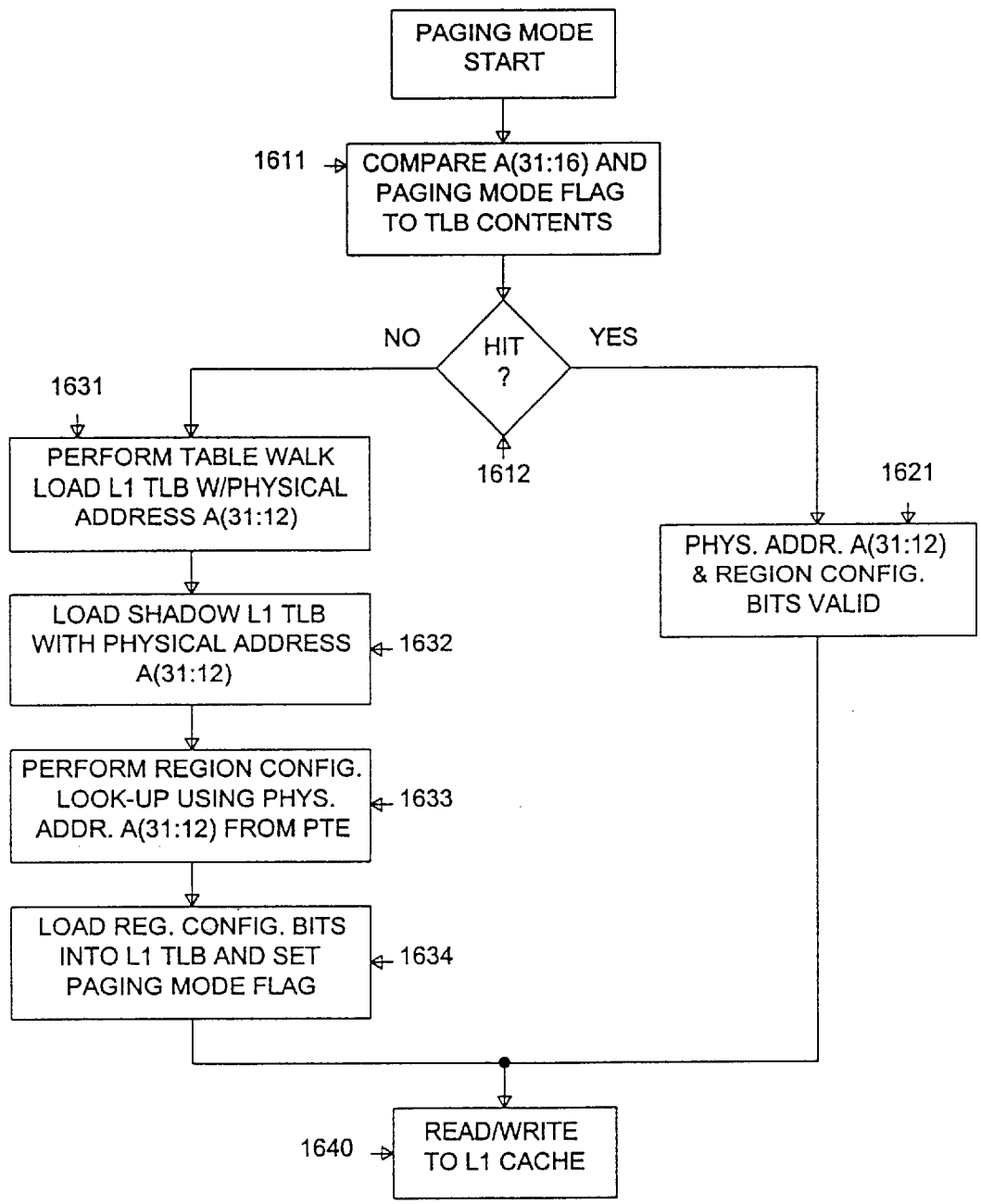
FIG. 16 is a flow diagram illustrating a paging mode addressing operation of an exemplary real mode L1 TLB according to one embodiment of the present invention.

The operation of the improved L1 TLB 1410 is explained in greater detail in FIGS. 15 and 16. FIG. 15 is a flow diagram illustrating a real mode addressing operation of an exemplary real mode L1 TLB 1410 according to one embodiment of the present invention. When processor 200 is operating in real mode and an address is sent to the exemplary L1 cache 1420, the L1 TLB 1410 compares the reference address A(31:16) with the stored address tag A(31:16) in tag array 1411, and control logic 1430 compares the real mode flag 1415 with the real mode flag of the processor 200 (process step 1511).

If the real mode flags and the address tag bits A(31:16) match, an L1 TLB "HIT" has occurred (process step 1512). The match between the real mode flags means that the tag address A(31:16) stored in tag array 1411 was stored during a real mode operation, similar to the pending address translation operation. Therefore, the physical address A(31:12) and the region configuration bits in the L1 TLB 1410 are valid (process step 1521) and may be used. The entire physical address A(31:5) may then be used to read or write data to or from the L1 cache (process step 1540).

If the real mode flags and the address tag bits A(31:16) do not match, an L1 TLB "MISS" has occurred (process step 1512). Since the processor is in real mode, the reference address A(31:12) is a physical address. Therefore, the physical address A(31:12) is loaded into the data array 1411 and tag array 1412 of the L1 TLB 1410 (process step 1531) and into the data array of the shadow L1 TLB 1421 (process step 1532).

The physical address A(31:12) is used to perform a region configuration look-up in the region comparators (process step 1533). The region configuration bits determined by the region. comparators are loaded, and the real mode flag 1415 is set, in the corresponding one of the sixteen entries of the L1 TLB 1410 (process step 1534). The contents of the L1 TLB 1410 are now valid and may be used to read or write data to or from the L1 cache (process step 1540).

FIG. 16 is a flow diagram illustrating a paging mode addressing operation of an exemplary real mode L1 TLB 1410 according to one embodiment of the present invention. When processor 200 is operating in paging-enabled mode and an address is sent to the exemplary L1 cache 1420, the L1 TLB 1410 compares the reference address A(31:16) with the stored address tag A(31:16) in tag array 1411, and control logic 1430 compares the page mode flag 1414 with the page mode flag of the processor 200 (process step 1611).

If the page mode flags and the address tag bits A(31:16) match, an L1 TLB "HIT" has occurred (process step 1612). The match between the page mode flags means that the tag address A(31:16) stored in tag array 1411 was stored during a paging mode address translation operation, similar to the pending address translation operation. Therefore, the physical address A(31:12) and the region configuration bits in the L1 TLB 1410 are valid (process step 1621) and may be used. The entire physical address A(31:5) may then be used to read or write data to or from the L1 cache (process step 1640).

If the page mode flags and the address tag bits A(31:16) do not match, an L1 TLB "MISS" has occurred (process step 1612). Since the processor is in paging mode, the reference address A(31:12) is a linear address. Therefore, a "table walk" of the PTE and the DTE (as described above) is performed in order to obtain a translated physical address A(31:12), and the physical address A(31:12) is loaded into the data array 1411 of the L1 TLB 1410 (process step 1631) and into the data array of the shadow L1 TLB 1421 (process step 1632). The linear address A(31:16) is loaded into the tag array 1411 of the L1 TLB 1410.

The physical address A(31:12) retrieved from the PTE is used to perform a region configuration look-up in the region comparators (process step 1633). The region configuration bits determined by the region comparators are loaded, and the page mode flag 1414 is set, in the corresponding one of the sixteen entries of the L1 TLB 1410 (process step 1634). The contents of the L1 TLB 1410 are now valid and may be used to read or write data to or from the L1 cache (process step 1640).

In an alternate embodiment of the present invention, the real mode TLB 1410 can be further simplified by eliminating the page mode flag 1414 and the real mode flag 1415 and invalidating all of the entries in the real mode TLB 1410 whenever processor 200 changes from paging mode to real mode or from real mode to paging mode. This may be accomplished by resetting the valid (V) bit in the access bits 1413 whenever control logic 1430 detects a change in the state of the REAL/PAGE MODE INDICATOR signal. In this implementation, when control logic 1430 detects a change in the state of the REAL/PAGE MODE INDICATOR signal, control logic 1430 generates a RESET VALID BIT signal that sets all of the valid (V) bits for all entries to "invalid". Thereafter, when an entry is accessed for the first time, the "invalid" state of the entry causes the cache line to be fetched from memory, thereby ensuring that the data in the L1 cache 1420 and the L1 TLB 1410 are correct for the new operating mode.

Although the present invention has been described in detail, those skilled in the art should understand that they can make various changes, substitutions and alterations herein without departing from the spirit and scope of the invention in its broadest form.

What is claimed is:

1. An address translation device for providing physical addresses to a physically-addressable cache in an x86-compatible processor capable of operating in real mode and paging mode, said cache including a shadow translation look-aside buffer for storing copies of untranslated physical addresses and a tag sector for storing copies of physical addresses, wherein output of said shadow translation look-aside buffer is directly compared with output of said tag sector, said address translation device comprising:

a tag array for storing received untranslated addresses in selected ones of N tag entries in said tag array during real mode operations and paging mode operations; and a data array for storing translated physical addresses corresponding to said untranslated addresses in selected ones of N data entries in said data array, wherein said untranslated addresses stored in said tag array during real mode operations are physical addresses equal to said corresponding translated physical addresses stored in said data array.

2. The address translation device set forth in claim 1 wherein said untranslated addresses stored in said tag array during paging mode operations are linear addresses.

3. The address translation device set forth in claim 1 further comprising a flag array for storing mode flags corresponding to said translated physical addresses in selected ones of N flag entries in said flag array.

4. The address translation device set forth in claim 3 wherein said mode flags indicate whether said corresponding translated physical addresses were stored in said data array during real mode operations.

5. The address translation device set forth in claim 3 wherein said mode flags indicate whether said corresponding translated physical addresses were stored in said data array during paging mode operations.

6. The address translation device set forth in claim 1 further comprising a region configuration array for storing region configuration bits corresponding to said translated physical addresses in selected ones of N region configuration entries in said region configuration array.

7. The address translation device set forth in claim 1 wherein said address translation device is an L1 translation look-aside buffer providing physical addresses to a Level 1 cache.

8. A computer system comprising:
an x86-compatible processor capable of operating in real mode and paging mode;
a system memory for storing data and instructions;
a cache associated with said processor for storing subsets of said data and said instructions stored in said system memory, and having a shadow translation look-aside buffer for storing physical addresses, wherein said physical addresses are directly comparable to physical addresses stored in said cache; and
an address translation device for providing physical addresses to said cache, said address translation device including
a tag array for storing received untranslated addresses in selected ones of N tag entries in said tag array during real mode operations and paging mode operations; and
a data array for storing translated physical addresses corresponding to said untranslated addresses in selected ones of N data entries in said data array, wherein said untranslated addresses stored in said tag array during real mode operations are physical addresses equal to said corresponding translated physical addresses stored in said data array.

9. The computer system set forth in claim 8 wherein said untranslated addresses stored in said tag array during paging mode operations are linear addresses.

10. The computer system set forth in claim 8 further comprising a flag array for storing mode flags corresponding to said translated physical addresses in selected ones of N flag entries in said flag array.

11. The computer system set forth in claim 10 wherein said mode flags indicate whether said corresponding translated physical addresses were stored in said data array during real mode operations.

12. The computer system set forth in claim 10 wherein said mode flags indicate whether said corresponding translated physical addresses were stored in said data array during paging mode operations.

13. The computer system set forth in claim 8 further comprising a region configuration array for storing region configuration bits corresponding to said translated physical addresses in selected ones of N region configuration entries in said region configuration array.

14. The computer system set forth in claim 8 wherein said cache is a Level 1 (L1) cache and said address translation device is an L1 translation look-aside buffer providing physical addresses to said L1 cache.

15. For use in an x86-compatible processor capable of operating in real mode and paging mode and having a physically-addressable cache, a method of operating an address translation device to provide physical addresses to the cache, the method comprising the steps of:
storing received untranslated addresses in selected ones of N tag entries in a tag array during real mode operations and paging mode operations;
storing translated physical addresses corresponding to the untranslated addresses in selected ones of N data entries in a data array, wherein the untranslated addresses stored in the tag array during real mode operations are physical addresses equal to the corresponding translated physical addresses stored in the data array; and
storing identical copies of the untranslated physical addresses in a shadow translation look-aside buffer in the cache, wherein output of the shadow translation look-aside buffer is directly comparable to the physical addresses stored in the cache.

16. The method set forth in claim 15 wherein the untranslated addresses stored in the tag array during paging mode operations are linear addresses.

17. The method set forth in claim 15 further comprising the step of storing mode flags corresponding to the translated physical addresses in selected ones of N flag entries in a flag array.

18. The method set forth in claim 17 wherein the mode flags indicate whether the corresponding translated physical addresses were stored in the data array during real mode operations.

19. The method set forth in claim 17 wherein the mode flags indicate whether the corresponding translated physical addresses were stored in the data array during paging mode operations.

20. The method set forth in claim 15 further comprising the step of storing region configuration bits corresponding to the translated physical addresses in selected ones of N region configuration entries in a region configuration array.

21. The method set forth in claim 15 wherein the address translation device is an L1 translation look-aside buffer providing physical addresses to a Level 1 cache.

* * * * *